United States Patent
Hayashi

(10) Patent No.: US 11,448,867 B2
(45) Date of Patent: Sep. 20, 2022

(54) ILLUMINATION APPARATUS, MICROSCOPE APPARATUS, AND CARTRIDGE

(71) Applicant: OLYMPUS CORPORATION, Hachioji (JP)

(72) Inventor: Kazuhiro Hayashi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 838 days.

(21) Appl. No.: 16/228,122

(22) Filed: Dec. 20, 2018

(65) Prior Publication Data

US 2019/0196165 A1 Jun. 27, 2019

(30) Foreign Application Priority Data

Dec. 26, 2017 (JP) .............................. JP2017-249133

(51) Int. Cl.
*G02B 21/06* (2006.01)
*F21V 14/08* (2006.01)
(Continued)

(52) U.S. Cl.
CPC .............. *G02B 21/06* (2013.01); *F21V 11/02* (2013.01); *F21V 14/08* (2013.01); *G02B 21/26* (2013.01)

(58) Field of Classification Search
CPC ...... G02B 21/06; G02B 21/26; G02B 17/006; G02B 6/0018; G02B 27/0927; G02B 27/48; G02B 3/0056; F21V 11/02; F21V 14/08; F21V 5/004; G02F 1/133524; G02F 1/1323; G03F 7/70075; G03F 7/70091;
(Continued)

(56) References Cited

U.S. PATENT DOCUMENTS 4,221,867 A * 9/1980 McFadden ........... G01N 21/253
356/244
6,396,628 B1 5/2002 Osa et al.
(Continued)

FOREIGN PATENT DOCUMENTS

JP H11023977 A 1/1999
JP H11072712 A 3/1999
(Continued)

OTHER PUBLICATIONS

Japanese Office Action dated Nov. 24, 2021 (and English translation thereof) issued in Japanese Application No. 2017-249133.
(Continued)

*Primary Examiner* — Stephone B Allen
*Assistant Examiner* — Rahman Abdur
(74) *Attorney, Agent, or Firm* — Holtz, Holtz & Volek PC

(57) ABSTRACT

An illumination apparatus includes a surface light source that emits illumination light and a micro louver film that limits components of a divergence of the illumination light that are parallel to a light emission plane of the surface light source. The illumination apparatus satisfies the following conditional expression:

$$20° \leq A \leq 60° \quad (1)$$

where A indicates, with reference to a direction for which the micro louver film limits the divergence of the illumination light, the maximum spread angle of the illumination light passing through the micro louver film.

16 Claims, 26 Drawing Sheets

(51) Int. Cl.
*F21V 11/02* (2006.01)
*G02B 21/26* (2006.01)

(58) Field of Classification Search
CPC .............. G03F 7/70566; G03F 7/70058; G03B 21/208; H01L 33/58; F24F 13/078; G03G 7/0046
USPC ................................................. 359/232, 613
See application file for complete search history.

(56) References Cited

U.S. PATENT DOCUMENTS

| | | | |
|---|---|---|---|
| 8,026,880 | B2 | 9/2011 | Mimura et al. |
| 8,780,426 | B2 | 7/2014 | Minabe |
| 2002/0191281 | A1 | 12/2002 | Osa et al. |
| 2005/0243413 | A1* | 11/2005 | Shimizu ............... G02B 17/006 359/385 |
| 2008/0088919 | A1 | 4/2008 | Hayashi |
| 2008/0117502 | A1 | 5/2008 | Shimizu et al. |
| 2009/0310215 | A1* | 12/2009 | Stimpson ............... G02B 21/26 359/393 |
| 2017/0330724 | A1* | 11/2017 | Okumura ............... H01J 37/20 |

FOREIGN PATENT DOCUMENTS

| | | |
|---|---|---|
| JP | H11133308 A | 5/1999 |
| JP | H11153755 A | 6/1999 |
| JP | 2005031360 A | 2/2005 |
| JP | 2005316163 A | 11/2005 |
| JP | 2006171025 A | 6/2006 |
| JP | 2006276218 A | 10/2006 |
| JP | 2008026924 A | 2/2008 |
| JP | 2008089727 A | 4/2008 |
| JP | 2008096895 A | 4/2008 |
| JP | 2011053716 A | 3/2011 |
| JP | 2012020549 A | 2/2012 |
| JP | 2016162731 A | 9/2016 |

OTHER PUBLICATIONS

Japanese Office Action (and English translation thereof) dated Apr. 26, 2022, issued in counterpart Japanese Application No. 2017-249133.
Chinese Office Action (and English translation thereof) dated Dec. 2, 2021, issued in counterpart Chinese Application No. 201811555988.2.

* cited by examiner

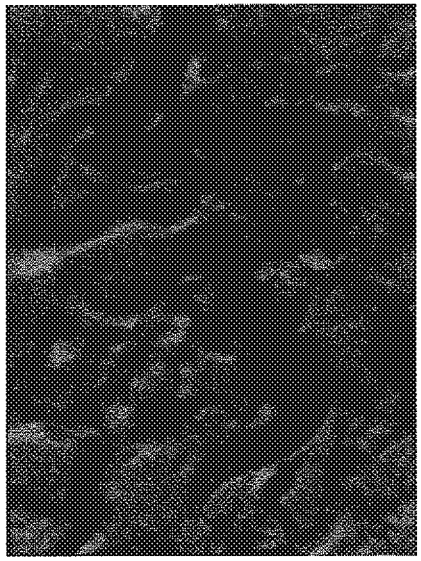
FIG. 13A
FIG. 13B
FIG. 13C
FIG. 13D

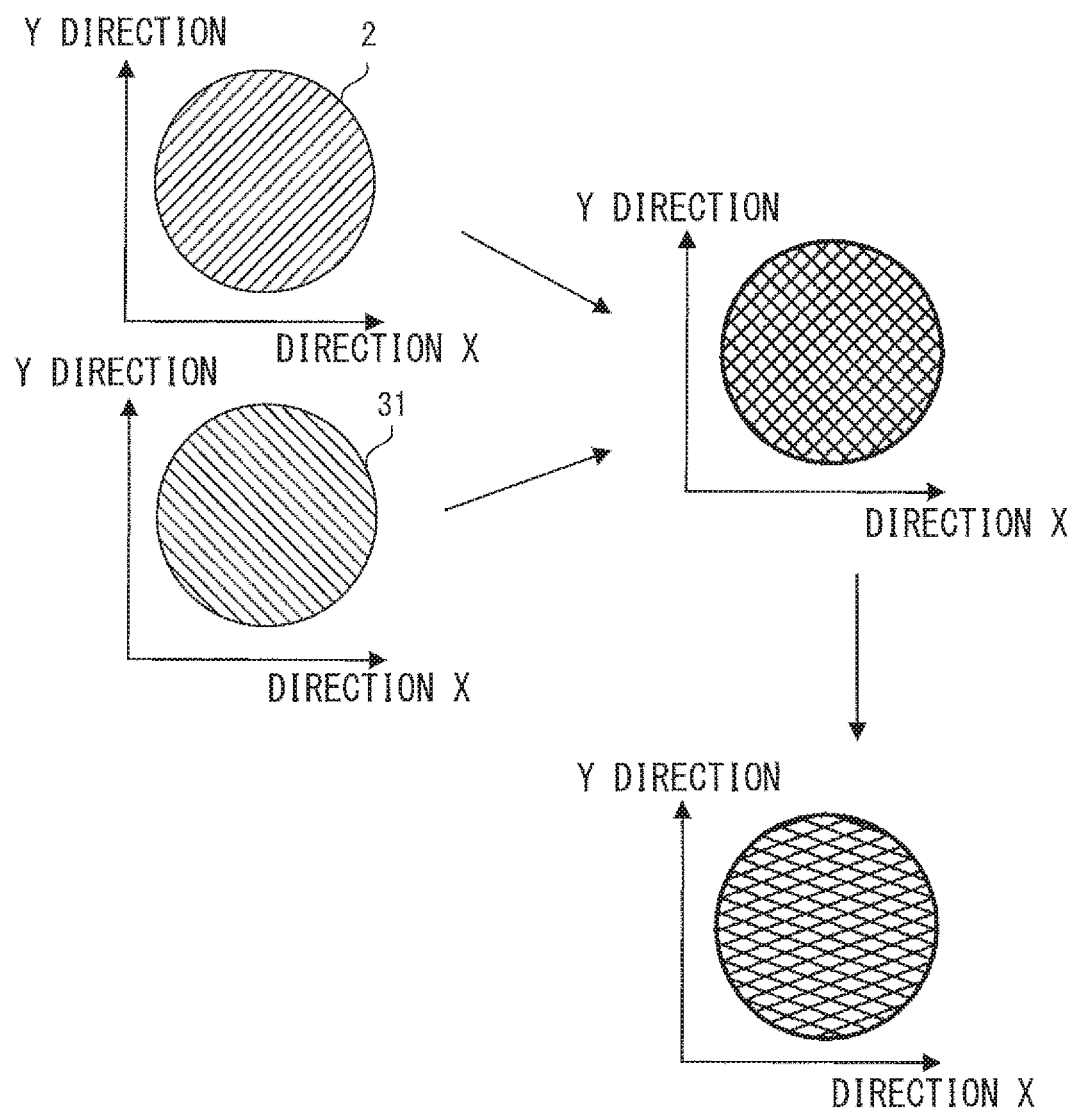
F I G. 15

ILLUMINATION APPARATUS, MICROSCOPE APPARATUS, AND CARTRIDGE

CROSS REFERENCE TO RELATED APPLICATIONS

This application is based upon and claims the benefit of priority from prior Japanese Patent Application No. 2017-249133, filed Dec. 26, 2017, the entire contents of which are incorporated herein by this reference.

BACKGROUND OF THE INVENTION

Field of the Invention

The present invention relates to an illumination apparatus for performing transmitted illumination using a surface light source, a microscope apparatus, and a cartridge.

Description of the Related Art

A known technique for a microscope apparatus for performing an observation by illuminating a sample using a surface light source is such that an incidence angle of illumination light is limited so that even a relatively transparent sample can be observed with the use of shading without an illumination apparatus having a remarkably increased thickness.

Japanese Laid-open Patent Publication No. 2005-316163 describes a transmitted illumination apparatus for a microscope, the apparatus including a light directing member that limits a divergence of illumination light with reference to at least one direction. In particular, this publication discloses the technique wherein the incidence angle of illumination light is limited using a light directing member relative to the maximum angle of the illumination light that depends on a relationship in distance between the shortest edge of a surface light source and a sample-placed plate.

SUMMARY OF THE INVENTION

An illumination apparatus in accordance with an aspect of the present invention includes a surface light source that emits illumination light and a micro louver film that limits components of a divergence of the illumination light that are parallel to a light emission plane of the surface light source. The micro louver film satisfies the conditional expression (1) below, where A indicates, with reference to a direction for which the micro louver film limits the divergence of the illumination light, the maximum spread angle of the illumination light passing through the micro louver film.

$$20°\leq A\leq 60° \quad (1)$$

An illumination apparatus in accordance with another aspect of the invention includes: a surface light source; a transparent mount on which a sample is placed; a cartridge that includes an optical member and a mechanical structure, the optical member blocking at least a portion of illumination light emitted from the surface light source, the mechanical structure moving the optical member so as to change the position or posture of the optical member within the cartridge; a supporting base that supports the cartridge between the surface light source and the transparent mount in an attachable/detachable manner; and means for reporting the position or posture of the optical member to a user.

A cartridge in accordance with another aspect of the invention is a cartridge to be mounted in an illumination apparatus, the cartridge including: an optical member that blocks at least a portion of illumination light emitted from a surface light source of the illumination apparatus; a mechanical structure moving the optical member so as to change the position or posture of the optical member within the cartridge; and a display part that includes a scale and an indicator and displays information on the position or posture of the optical member, one of the scale and the indicator being moved in conjunction with the mechanical structure relative to the other of the scale and the indicator.

BRIEF DESCRIPTION OF THE DRAWINGS

The present invention will be more apparent from the following detailed description when the accompanying drawings are referenced.

FIGS. 13A-13D depict images of nematodes (C. elegans) on agar media that are each captured using a different micro louver film combination to achieve a different shading pattern, wherein the nematodes are examples of samples observed using a microscope apparatus of the present invention;

FIG. 15 is an explanatory diagram for examples of micro louver films placed within an illumination apparatus to obtain images depicted in FIGS. 13A-13D;

DESCRIPTION OF THE EMBODIMENTS

The appearance of a sample does not depend on the size of a surface light source but is largely dependent on the angle of illumination light. Hence, when a surface light source is extremely large or small, simply satisfying the condition indicated in Japanese Laid-open Patent Publication No. 2005-316163 could be insufficient to perform an observation.

In particular, if the maximum angle of illumination light incident on a sample is excessively large, this could be a hindrance to the observation because sufficient shading cannot be obtained; if the maximum angle of the illumination light is excessively small, this could result in an unclear image due to excessively strong shading.

The present invention was provided by creating, on the basis of the technique indicated in Japanese Laid-open Patent Publication No. 2005-316163, a technique for limiting the maximum angle of illumination light so as to achieve shading appropriate for observations.

Figure 1:
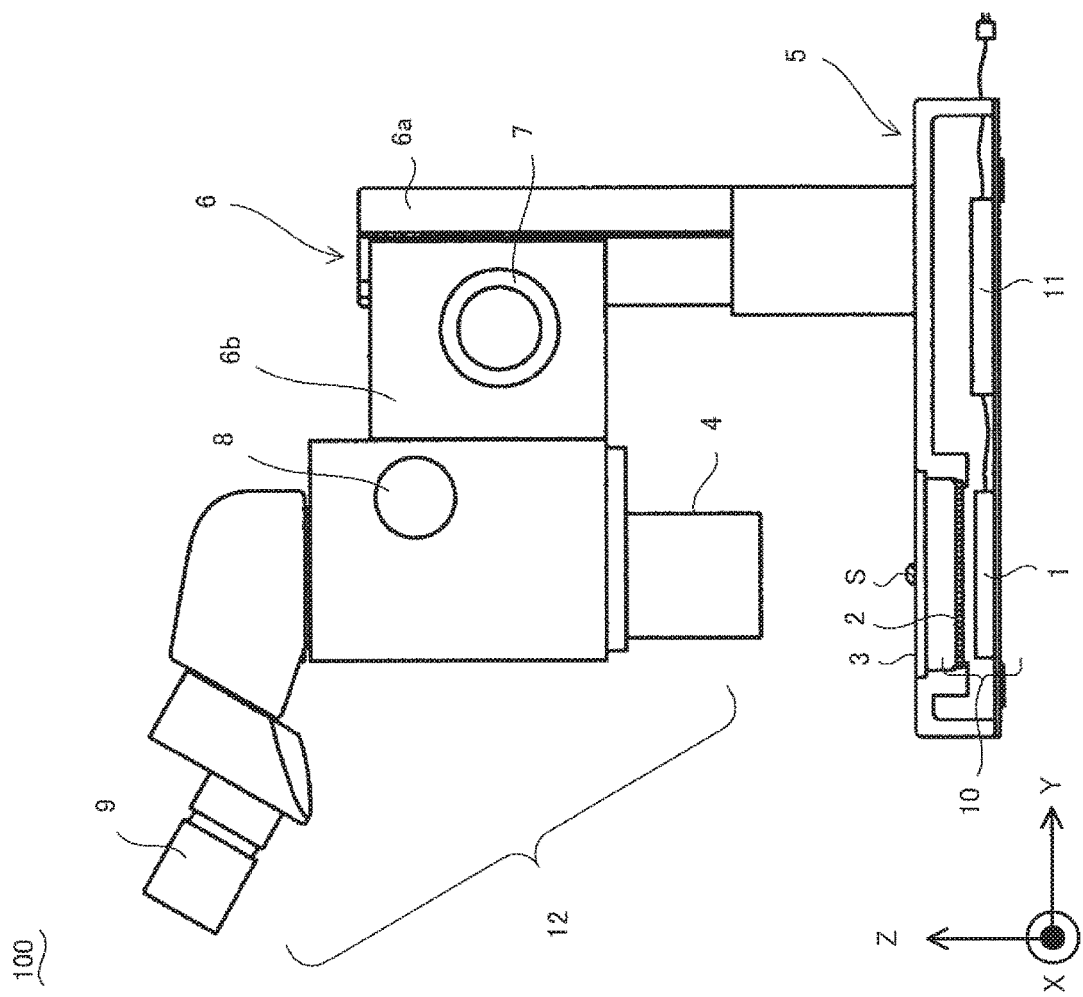
FIG. 1 is a diagram illustrating the configuration of a microscope apparatus in accordance with a first embodiment.

The following describes an illumination apparatus 10 and a microscope apparatus 100 in accordance with a first embodiment of the invention. FIG. 1 illustrates the configuration of the microscope apparatus 100. In FIG. 1, a direction normal to a light emission plane of a surface light source 1 is defined as Z direction, a direction in which an observer faces the microscope apparatus 100 within the light emission plane is defined as Y direction, and a direction orthogonal to Y direction within the light emission plane is defined as X direction. The light emission plane refers to a surface of the surface light source 1 from which illumination light is emitted.

The microscope apparatus 100 includes the illumination apparatus 10, a sample placement plate 3, an illumination base 5, a focusing apparatus 6, a focusing handle 7, a zoom handle 8, and a detection optical system 12.

The illumination apparatus 10 includes the surface light source 1, a micro louver film 2, and a power source 11. The surface light source 1 includes a LED, an organic EL element, a combination of a fluorescent tube and a light guide plate, or the like and emits illumination light to irradiate sample S. The power source 11 is connected to a commercial power supply (not illustrated) and supplies power to the surface light source 1. The micro louver film 2 is disposed on an optical path on a stage subsequent to the surface light source 1. Sample S is a relatively transparent sample through which light passes. The illumination base 5 includes the illumination apparatus 10 and the sample placement plate 3.

Figure 2:
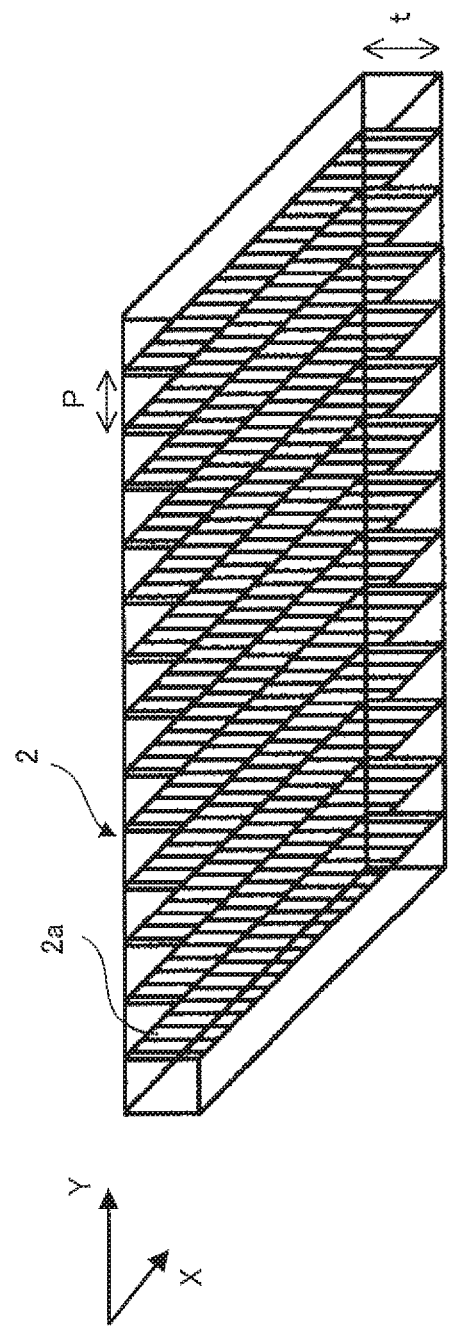
FIG. 2 is an explanatory diagram for the configuration of a micro louver film that limits a light flux for Y direction.

FIG. 2 is an explanatory diagram for the configuration of the micro louver film 2. The micro louver film 2 includes a plurality of light blocking plates 2a disposed apart (i.e. at equal intervals) within a parallel-plate-shaped transparent resin with optical transparency. In the examples depicted in FIGS. 1 and 2, the light blocking plates 2a are orthogonal to the light emission plane of the surface light source 1. The interval between the light blocking plates 2a is defined as pitch P, and the length of the light blocking plate 2a in Z direction is defined as width t.

Illumination light incident on the light blocking plate 2a is absorbed and thus is not guided to a subsequent stage. Hence, illumination light that passes through spaces between the plurality of light blocking plates 2a without being incident on the light blocking plates 2a reaches the sample placement plate 3 on the stage subsequent to the micro louver film 2. Accordingly, the micro louver film 2 serves to limit, for Y direction, a divergence of illumination light for irradiating sample S. Note that a stage subsequent to a certain object refers to a position that follows the object in a travelling direction of illumination light.

Figure 3:
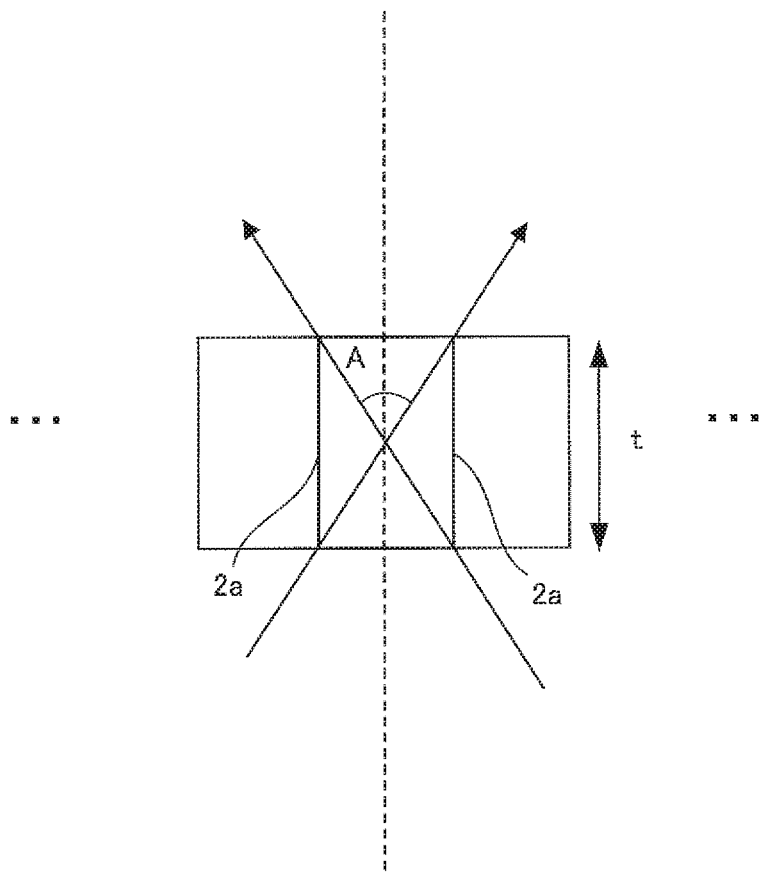
FIG. 3 is an enlarged view of some of a plurality of light blocking plates of a micro louver film.

FIG. 3 is an enlarged view of some of the plurality of light blocking plates 2a of the micro louver film 2. In FIG. 3, spread angle A indicates, with reference to a direction for which the micro louver film 2 limits a divergence of illumination light, the maximum spread angle of a light flux passing through the micro louver film 2 without being blocked by the light blocking plate 2a. In the example indicated in FIG. 3, accordingly, the micro louver film 2 limits the angle (maximum spread angle) of the divergence of the illumination light flux emitted from the surface light source 1 to spread angle A or smaller. The maximum spread angle of the illumination light flux can be changed, as appropriate, by changing the pitch between the light blocking plates 2a of the micro louver film 2 and the width t of the light blocking plates 2a in Z direction.

The sample placement plate 3 is a placement plate on which sample S is to be placed, wherein the sample placement plate 3 is located on a stage subsequent to the micro louver film 2, i.e., the micro louver film 2 is located between the sample placement plate 3 and the surface light source 1. The sample placement plate 3 has optical transparency. Illumination light that passes through the micro louver film 2 irradiates the sample S placed on the sample placement plate 3.

The illumination apparatus 10 has a size such that the entirety of an area that can be observed using an objective can be illuminated.

The focusing apparatus 6 includes a strut part 6a and a movable part 6b and can perform a focusing task by moving the movable part 6b in Z direction relative to the strut part 6a. For example, in response to an operator manipulating the focusing handle 7, the focusing apparatus 6 may operate a driving mechanism (not illustrated) to drive the movable part 6b relative to the strut part 6a.

The detection optical system 12 includes an objective 4 and an ocular lens 9 and forms a detection optical system for a stereo-microscope. The detection optical system 12, which is located on a stage subsequent to the sample placement plate 3, i.e., located on an opposite side from the surface light source 1 when seen from the sample placement plate 3, receives light that has traveled via the objective 4 through sample S. The light received by the objective 4 is guided to the observer's eyes via the ocular lens 9. An observation magnification of the detection optical system 12 is changed in response to the operator manipulating the zoom handle 8.

Figure 4A:
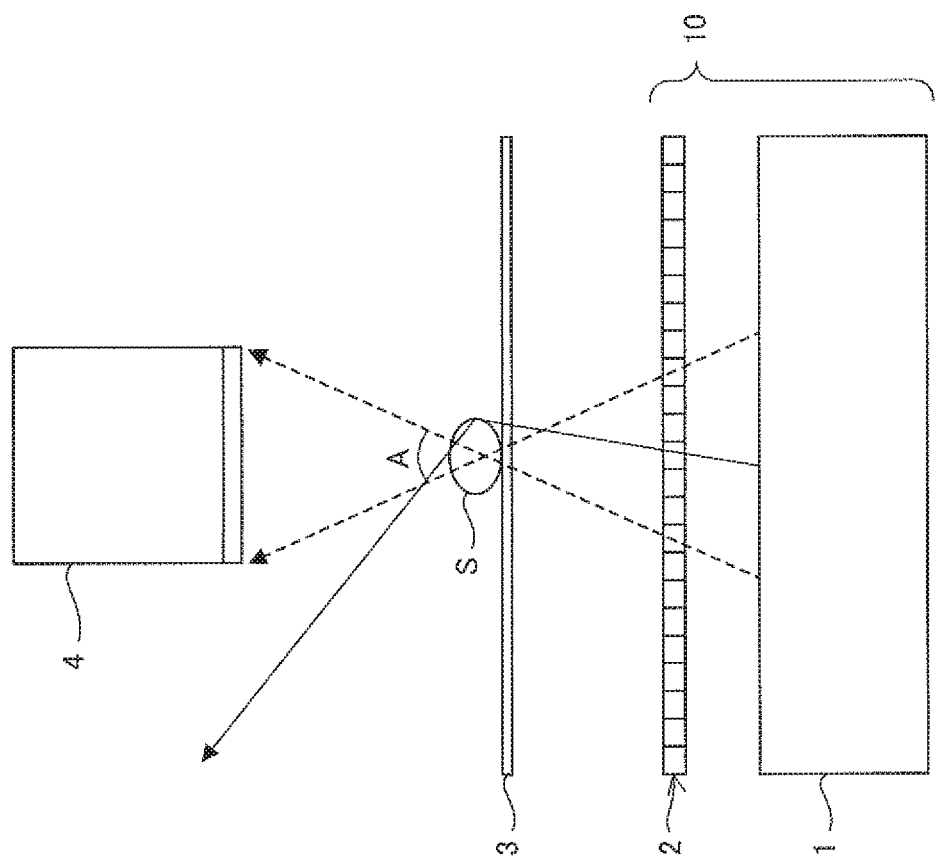
FIG. 4A illustrates trails of some light rays of a conventional illumination apparatus that does not include a micro louver film.

In a configuration in which a surface light source is used without installing a light directing member (see FIG. 4A), an illumination light flux is emitted, the illumination light flux typically having a maximum spread angle that is so large that an objective would not be able to receive the flux, and the light is distributed over a wide angle. Hence, many of light rays refracted by an edge portion of a transparent sample S reach the objective 4. Accordingly, shading on an image of sample S becomes weak, and this results in a problem that the view of the sample, i.e., the objected to be observed, becomes unclear.

Figure 4B:
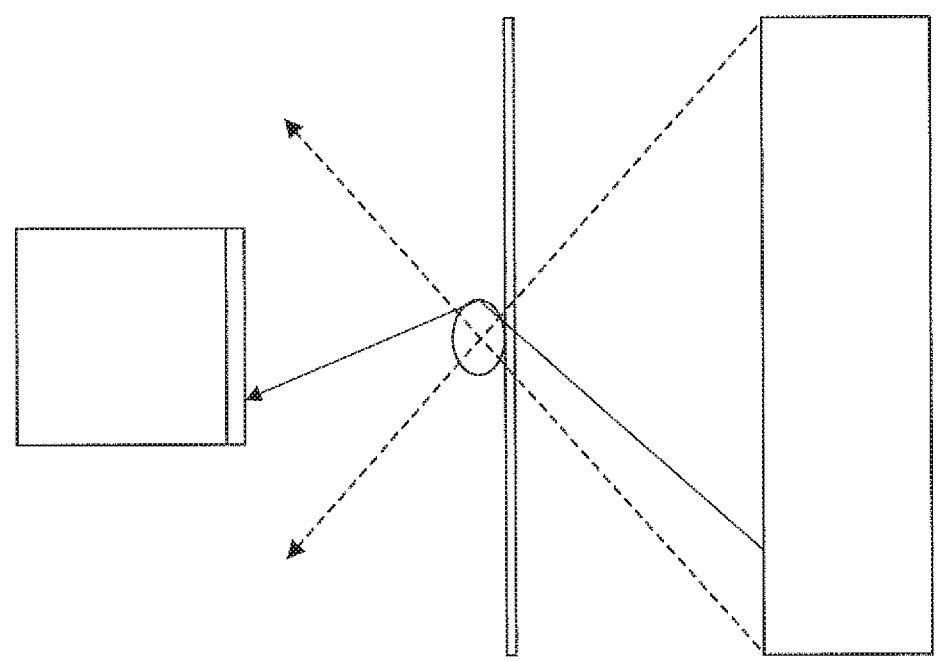
FIG. 4B illustrates trails of some light rays of an illumination apparatus in accordance with a first embodiment.

Meanwhile, in the configuration of the microscope apparatus 100 that includes the illumination apparatus 10, illumination light that reaches a surface of the sample placement plate 3 on which sample S is placed is limited to light fluxes falling within a spread angle A that depends on the arrangement of the light blocking plates 2a of the micro louver film 2. In such a configuration, light rays refracted by some of the edge portions do not reach the objective 4 (see FIG. 4B). Accordingly, limiting the maximum spread angle A of the illumination light flux for illuminating sample S can facilitate generation of shading in comparison with a situation without the micro louver film 2. Therefore, sample S can be observed with clear views.

In the configuration for illuminating sample S, as described above, as the divergence of an illumination light flux for irradiating sample S is limited to a higher degree, i.e., as spread angle A becomes smaller, shading can be generated more easily; preferable or unpreferable conditions for an observation may be achieved depending on the degree of the limitation on the divergence (the degree of spread angle A).

For the present invention, accordingly, conditions to achieve a more preferable spread angle A for an observation were considered. As a result of the consideration, it was found that a preferable observation can be performed by making spread angle A fall within the range of the following conditional expression for at least one direction:

$$20° \leq A \leq 60° \quad (1)$$

When spread angle A is greater than 60 degrees, light refracted by an edge portion is received to some degree via the objective 4, thereby leading to weak shading. In particular, a smaller angle of refraction caused by sample S results in weaker shading, thereby making the image less clear.

When spread angle A is less than 20 degrees, light rays forming an angle larger than 20 degrees are not incident, and hence many light rays refracted by edge portions fail to reach the objective 4, with the result that shading becomes strong. Excessively strong shading increases the percentage of blacked-out regions and thus makes it difficult to observe sample S.

Accordingly, performing illumination using the illumination apparatus 10 within the range of conditional expression (1) allows sample S to be observed with appropriate shading.

To perform an observation more preferably, it is further desirable that the micro louver film 2 satisfy conditional expression (1').

$$30° \leq A \leq 50° \quad (1')$$

To perform illumination achieving a uniform brightness within a field of view, the illumination apparatus 10 is desirably configured to satisfy the conditional expression (2) below, where P indicates a pitch that is the interval between the plurality of light blocking plates 2a, L indicates the distance between a surface of the sample placement plate 3 on which sample S is placed and a surface of the micro louver film 2 located on the sample-placement-plate-3 side, and NA indicates a numerical aperture of the detection optical system 12. In particular, NA indicates a numerical aperture of the detection optical system 12 for the lowest magnification used by the microscope apparatus 100, i.e., the lowest numerical aperture of the detection optical system 12 when using the microscope apparatus 100.

$$P < NA \times L \quad (2)$$

Figure 5:
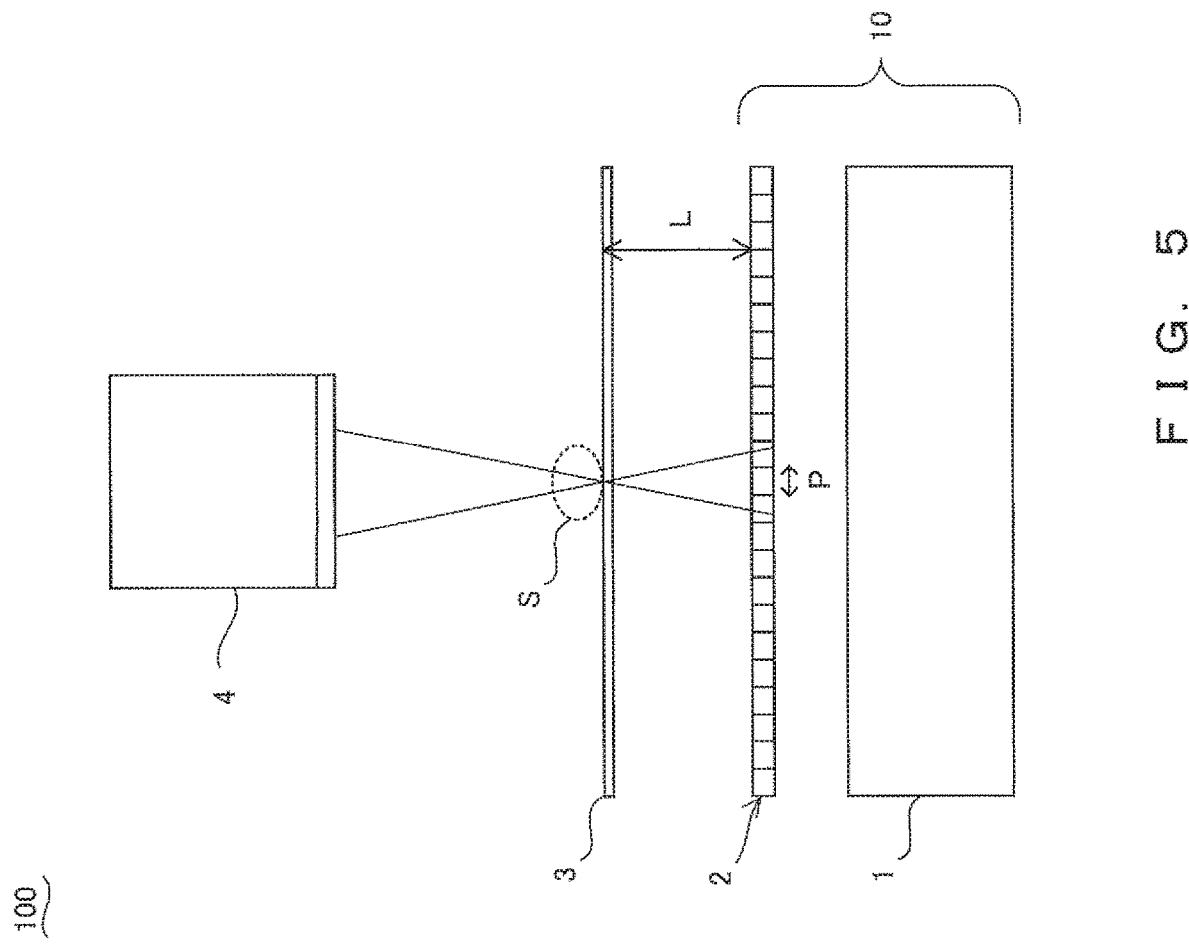
FIG. 5 is another diagram illustrating the configuration of a microscope apparatus in accordance with a first embodiment.

FIG. 5 depicts, as with FIG. 1, the configuration of the microscope apparatus 100, wherein the L and P descried above are indicated. When the objective 4 receives, as depicted in FIG. 5, light fluxes from a region that includes the plurality of light blocking plates 2a (i.e., when conditional expression (2) is satisfied), differences in position within the field of view do not lead to large differences in percentage of blocked light between the light blocking plates 2a. Accordingly, the microscope apparatus 100 can obtain a uniform image with small differences in brightness between positions within the field of view.

By contrast, when conditional expression (2) is not satisfied, differences in position within the field of view lead to large differences in percentage of blocked light between the light blocking plates 2a. More particularly, in accordance with positions within the field of view, illumination light flux pass through a region in which the light blocking plate 2a is not present (the area of the light blocking plate 2a is essentially zero) or pass through a region in which the light blocking plate 2a is present (an area corresponding to one light blocking plate 2a is present). This results in large differences in brightness between positions within the field of view. Such differences in brightness provide repetitive patterns of shading, and an image with ununiform brightness is formed.

Accordingly, satisfying conditional expression (2) can reduce nonuniformity of illumination light fluxes for irradiating the surface of the sample placement plate 3 on which sample S is placed, thereby achieving a uniform intensity distribution.

When the microscope apparatus 100 is a stereo-microscope as in the noted configuration, the divergence of illumination light is desirably limited to a higher degree for a direction perpendicular to a plane that includes the optical axis of a right-eye observation optical system and the optical axis of a left-eye observation optical system, i.e., Y direction (a vertical direction of an image seen by the observer). In the stereo-microscope, when the divergence of illumination light is limited to a higher degree for the X direction of sample S, an image generated by the left-eye observation optical system and an image generated by the right-eye observation optical system each have strong shading in a different direction. As a result, it would be exhausting for the observer to see the image especially when the observation is performed for a long time. Accordingly, for the application wherein an observation is performed for a long time using a stereo-microscope, it is preferable that no strong shading be generated in the left-right direction (X direction) of an image. In particular, the microscope apparatus 100, i.e., a stereo-microscope, desirably has the configuration described above to limit the divergence of illumination light to a higher degree for Y direction. Meanwhile, for the application wherein determinations are made in a short time using an image with strong shading without performing a long-time observation, it is desirable that the divergence of illumination light be also limited to a high degree for X direction so as to generate strong shading in the left-right direction (X direction) of the image.

In addition to stereo-microscopes, the ideas described above are applicable to other types of microscopes. When a microscope apparatus has two optical axes with inward angles, the two optical axes being arranged in X direction, it is generally desirable that the divergence of illumination light be limited to a higher degree for a direction perpendicular to a plane that includes the two optical axes, i.e., Y direction.

Figure 6:
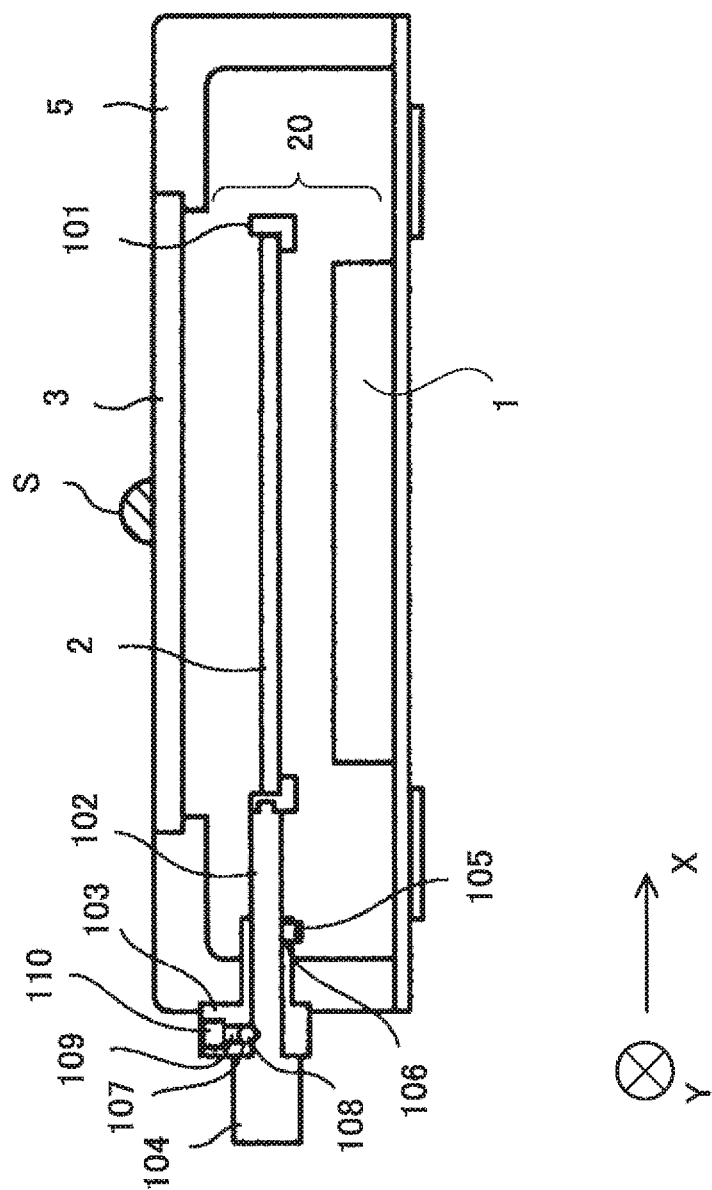
FIG. 6 illustrates the configuration of an illumination apparatus in accordance with a second embodiment.

The following describes an illumination apparatus 20 and a microscope apparatus 200 in accordance with a second embodiment of the invention. FIG. 6 illustrates the configuration of the illumination apparatus 20. Like components of the illumination apparatus 20 are given like reference marks to those of the illumination apparatus 10. The illumination apparatus 20 is different from the illumination apparatus 10 in that the illumination apparatus 20 further includes components for holding the micro louver film 2. The microscope apparatus 200 includes the illumination apparatus 20 instead of the illumination apparatus 10.

A frame 101 holds the micro louver film 2. An axle 102 includes one end portion fixed to the frame 101 and another end portion at which a lug 104 is provided. The axle 102 is held by a bearing 103 in a rotationally movable manner.

The axle 102 includes a screw 105. The screw 105 is fitted into a groove 106 formed in the bearing 103, so as to control rotation and serve as a stopper.

The bearing 103 includes a hole 7 into which a ball 108, a spring 109, and a threaded part 110 are inserted. The ball 108 is pressed against the axle 102 by the force of the spring 109 so as to hold the rotational movement of the axle 102 at an arbitrary angle.

Figure 7:
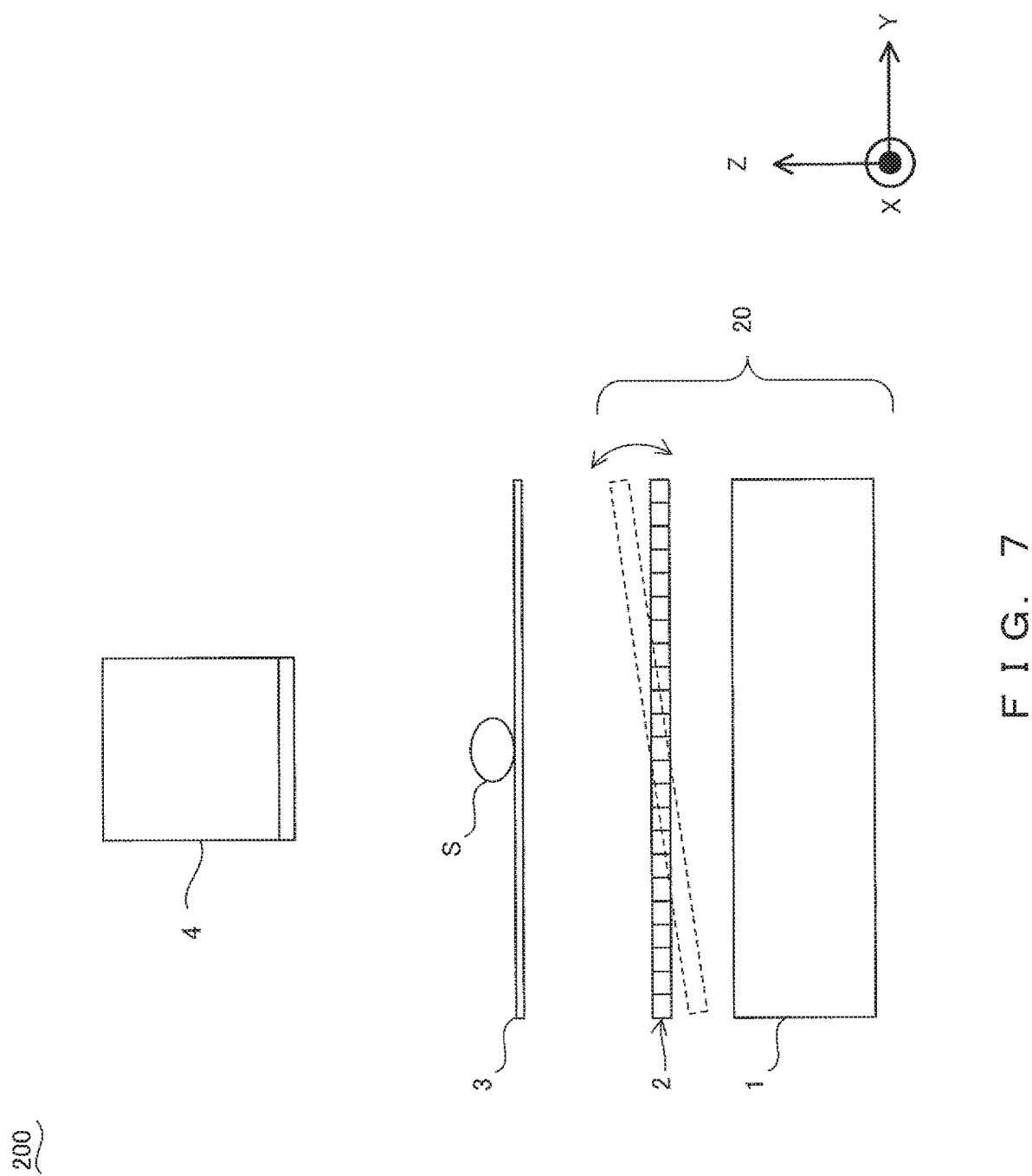
FIG. 7 illustrates a situation in which a micro louver film is inclined.

When the micro louver film 2 is inclined by manipulating the lug 104 and rotating the micro louver film 2 around X axis, i.e., an axis parallel to the light emission plane of the surface light source, illumination light can be emitted obliquely to sample S, thereby achieving oblique illumination. FIG. 7 illustrates a situation in which the micro louver film 2 is inclined. In the example depicted in FIG. 7, illumination inclined in Y direction is achieved by inclining the micro louver film 2, with reference to the light emission plane of the surface light source (XY plane) (solid line), by manipulating the lug 104 with X axis serving as a rotation axis (dotted line).

Figure 8:
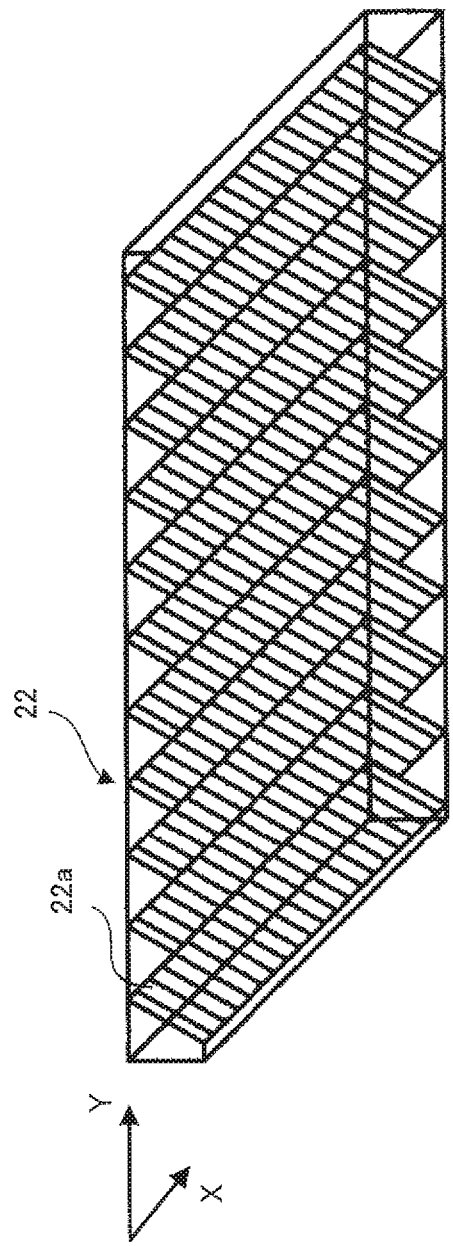
FIG. 8 illustrates a situation in which light blocking plates are inclined with respect to a surface of a micro louver film.

A micro louver film 22 depicted in FIG. 8 may be used wherein light blocking plates 22a are not orthogonal to the film surface but is inclined in the Y-axis direction. In addition, the micro louver film 2 depicted in FIG. 7 may be replaced with a micro louver film 22 having an inclined angle, so that without remarkably increasing the thickness of the illumination apparatus, the angle of inclination of illumination can be enlarged or non-oblique illumination can be achieved by offsetting the angle.

As described above, the illumination apparatus 20 or the microscope apparatus 200 allows the inclination of illumination light in Y direction to be adjusted with a higher degree of freedom by inclining the micro louver film 2.

For example, the illumination apparatus 20 may include a rotatable mechanism that holds the micro louver film 2 to the frame 101 in a rotatable manner and rotates the micro louver film 2 about a line normal to the plane of the micro louver film 2. The rotation allows a direction for which the micro louver film 2 limits the divergence of light to be switched to another direction. The rotatable mechanism that inclines the micro louver film 2 may be rotated by a drive motor such as a stepping motor.

Figure 9:
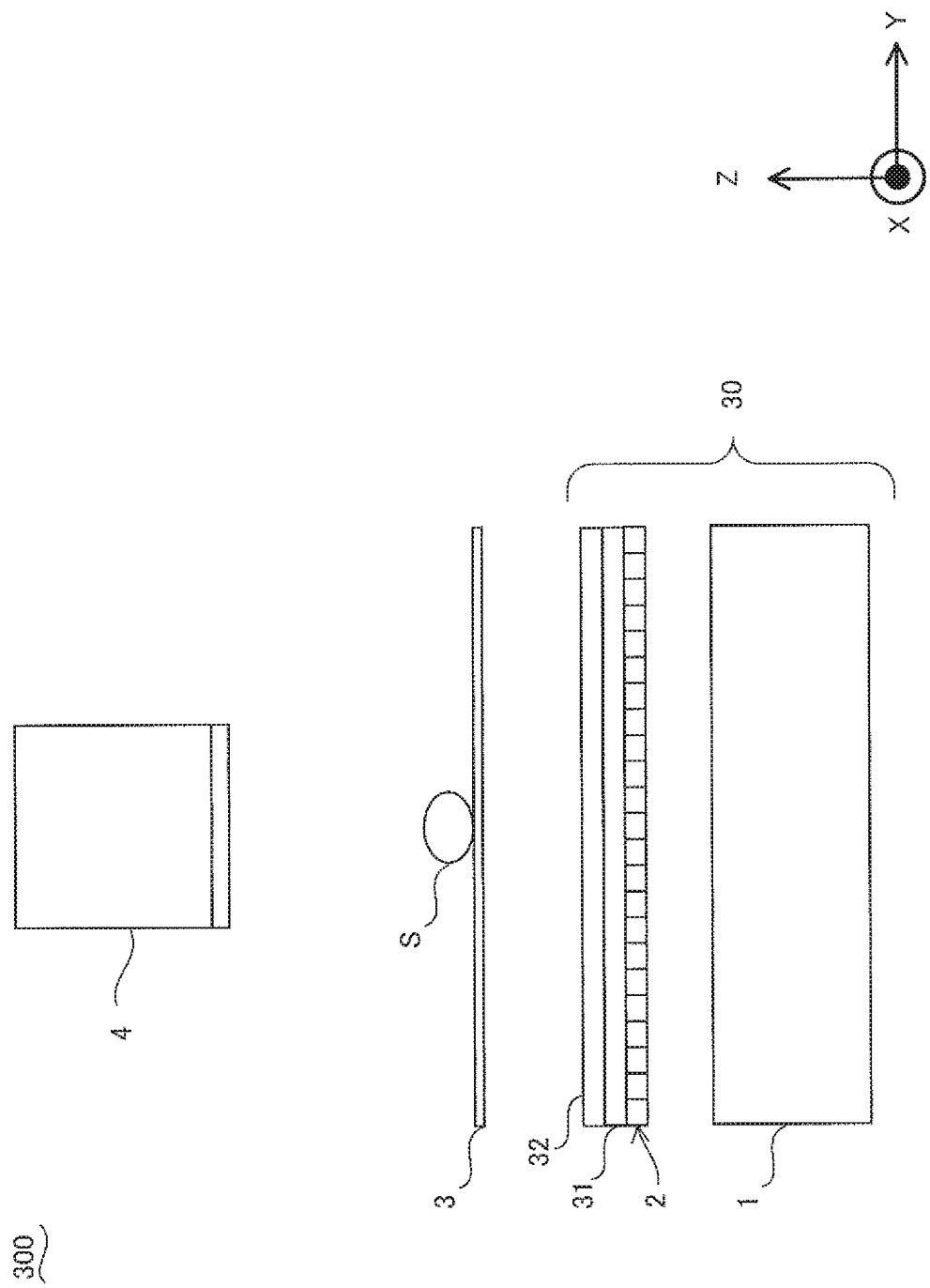
FIG. 9 illustrates the configuration of an illumination apparatus in accordance with a third embodiment.

The following describes an illumination apparatus 30 and a microscope apparatus 300 in accordance with a third embodiment of the invention. FIG. 9 illustrates the configuration of the illumination apparatus 30. Like components of the microscope apparatus 300 are given like reference marks to those of the microscope apparatus 100. The illumination apparatus 30 is different from the illumination apparatus 10 in that the illumination apparatus 30 further includes a micro louver film 31 and diffuser plate 32 between the micro louver film 2 and the sample placement plate 3.

Figure 10:
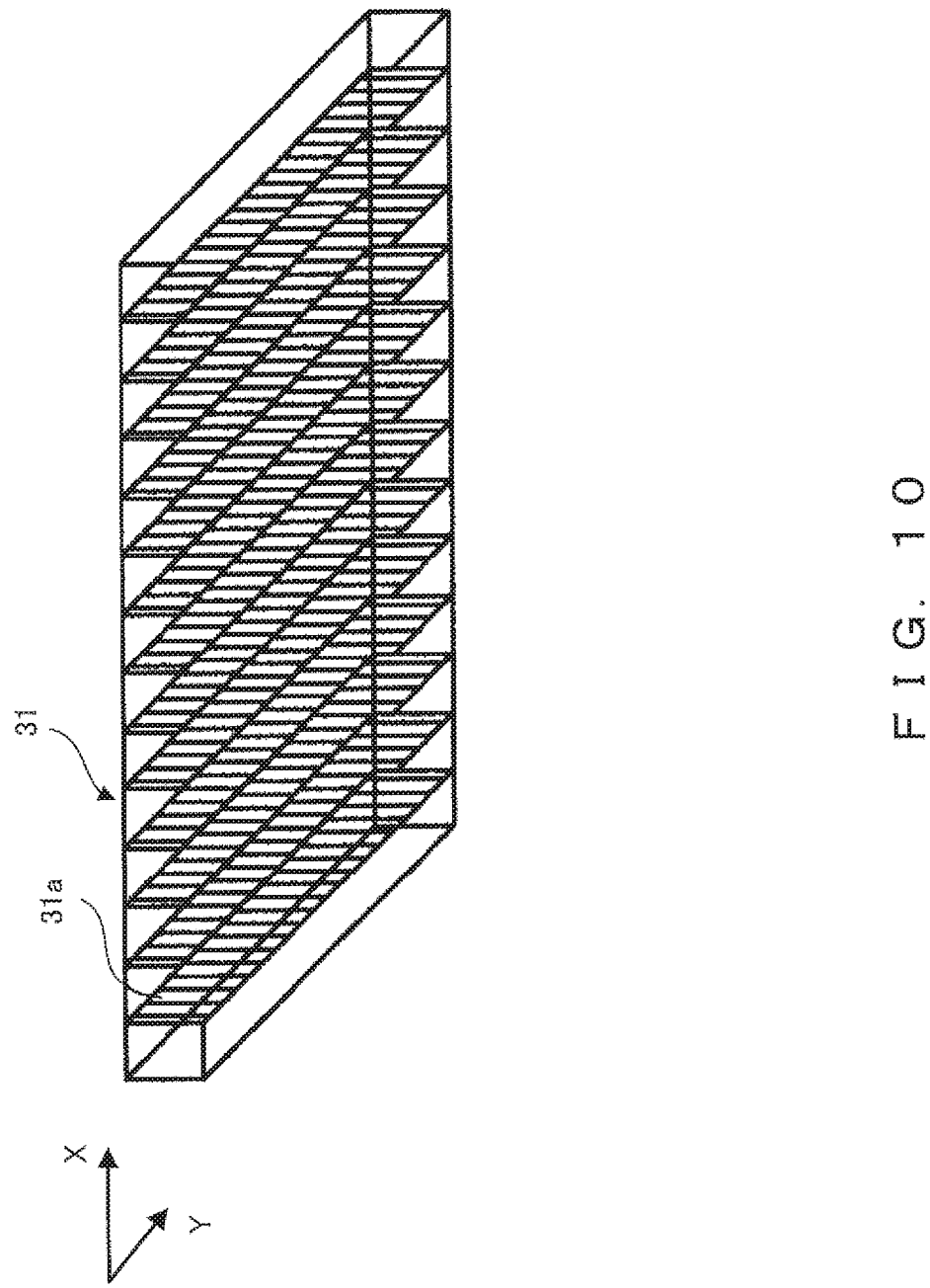
FIG. 10 is an explanatory diagram for the configuration of a micro louver film that limits a light flux for X direction.

The micro louver film 31 has a configuration similar to that of the micro louver film 2 but is arranged in a different orientation from the direction of the micro louver film 2. FIG. 10 is an explanatory diagram for the configuration of the micro louver film 31.

The micro louver film 31 has a plurality of light blocking plates 31a (similar to the light blocking plates 2a) arranged therewithin at certain intervals, the light blocking plates 31a each having a surface with a light blocking property. As with the light blocking plate 2a, the light blocking plate 31a is disposed in a manner such that the plane including the surface of the light blocking plate 31a that has a light blocking property intersects the light emission plane of the surface light source 1. The surface of the light blocking plate 31a that has a light blocking property is arranged to be parallel to Y direction. In particular, while the micro louver film 2 of the first embodiment limits the divergence of illumination light for Y direction, the micro louver film 31 limits the divergence of illumination light for X direction.

In the configuration described above, the divergence of illumination light is limited not only for Y direction but also X direction, so that shading preferable for an observation can be provided for any direction such as the up-down direction or left-right direction of the field of view of the detection optical system 12.

The diffuser plate 32 diffuses illumination light to the extent that essentially no influences are imposed on the limiting of the divergence of illumination light performed by the micro louver films (2, 31). Providing the diffuser plate 32 between the sample placement plate 3 and the micro louver film can make invisible moire fringes or the like that could occur due to the two micro louver films 2 and 31 being placed over each other. Even when the micro louver film and sample S are positioned close to each other, lines that could be provided within an image by light blocking plates within the micro louver film can be made invisible.

It is desirable that the illumination apparatus of the embodiments described above also satisfy the following conditional expression (3):

$$\tan A/2 < D/2L \quad (3)$$

In the expression above, A indicates the maximum spread angle of an illumination light flux, D indicates the length of the shortest edge of the surface light source 1, L indicates the distance between the surface of the sample placement plate 3 on which sample S is placed and the surface of the micro louver film 2 on the sample-placement-plate-3 side. Satisfying conditional expression (3) means that the surface light source 1 is sufficiently large relative to the size of the micro louver film. When the conditional expression (3) is not satisfied, the divergence of light output from the surface light source 1 is not limited.

Combining the configurations of the second and third embodiments as described above allows the strength of shading and the inclination of oblique illumination to be adjusted with a higher degree of freedom.

Figure 11:
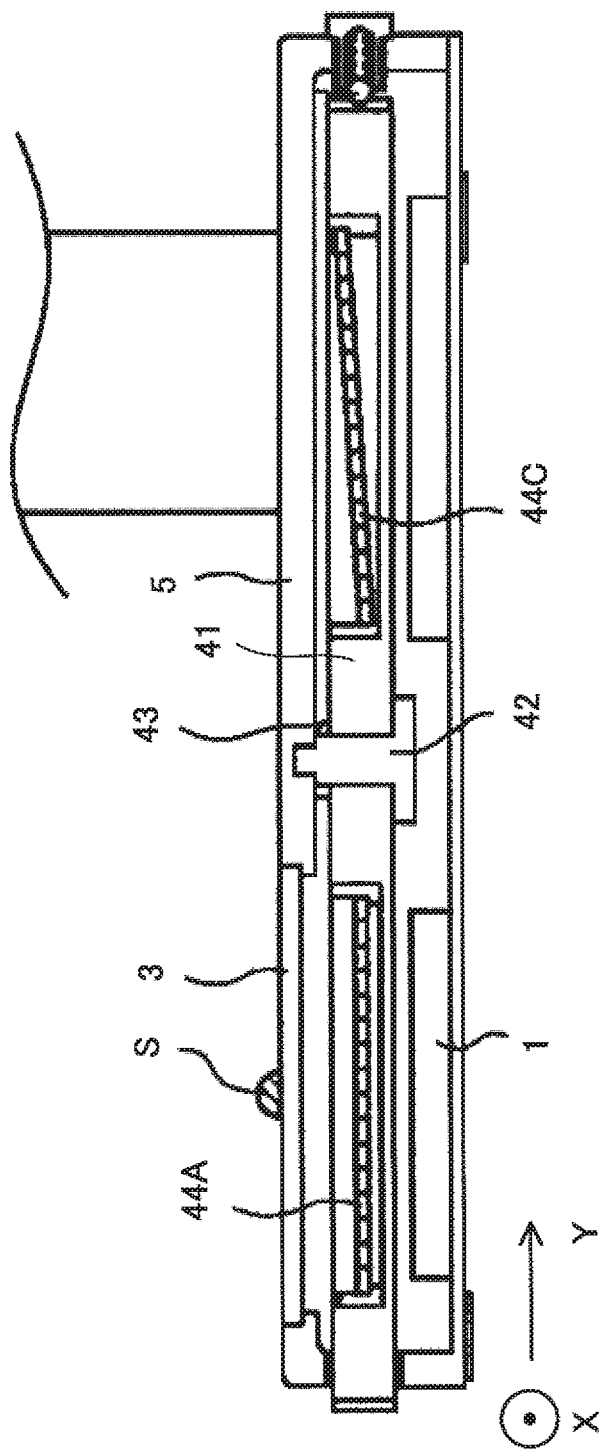
FIG. 11 illustrates the configuration of an illumination apparatus in accordance with a variation.

The following describes a variation of the embodiments described above. FIG. 11 illustrates a portion of a microscope apparatus in accordance with the variation. In the variation, the microscope apparatus includes a plurality of micro louver films that can be switched between. In particular, the microscope apparatus includes a turret 41 as a mechanism for allowing the micro louver films to be switched between, the turret 41 being supported to be rotatable about an axle 42 with respect to the illumination base 5. A spacer 43 for limiting a wobble while the turret 41 is rotating is provided between the turret 41 and the illumination base 5.

Figure 12:
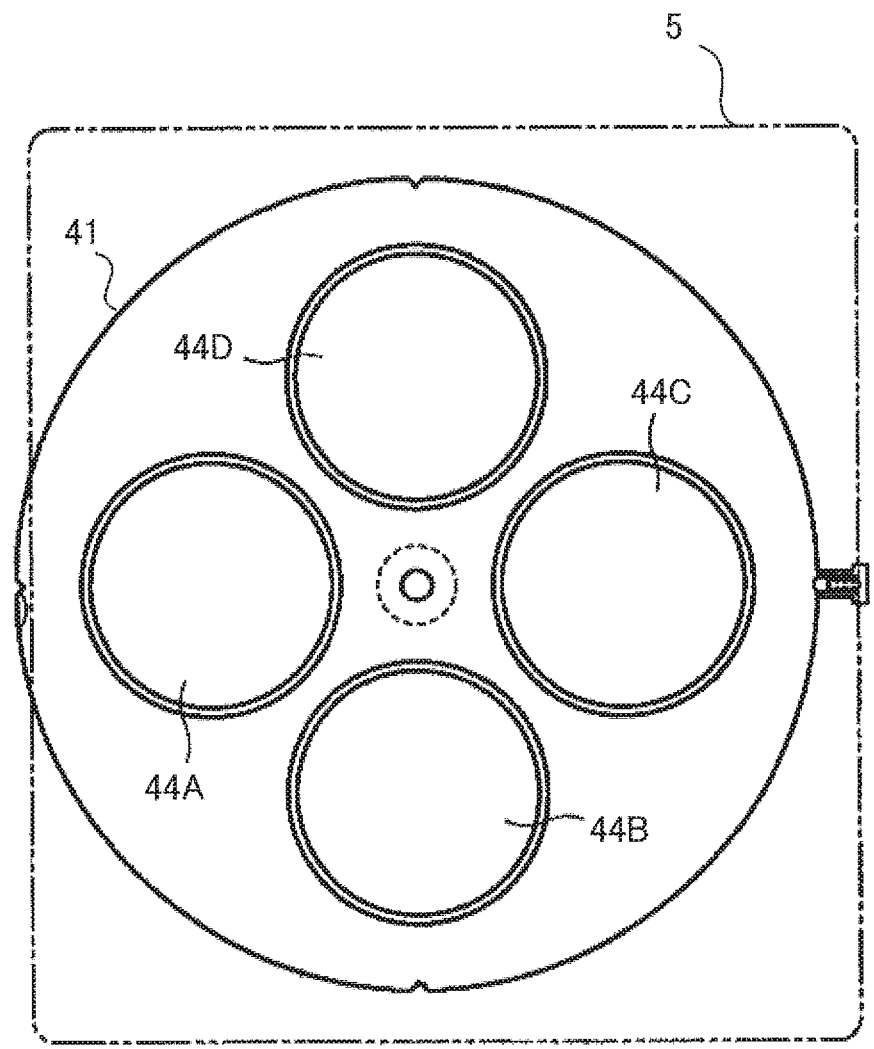
FIG. 12 is a cross-sectional view of an illumination apparatus in accordance with a variation as seen from above in Z direction.

The turret 41 has a plurality of types of light directing members 44A-44D (including the various micro louver films of the embodiments described above and combinations of such films) mounted therein. The rotation of the turret 41 places a desired light directing member over the surface light source 1, i.e., switches between light directing members for a member that serves as a portion of the illumination apparatus. FIG. 12 illustrates the turret 41 as seen from above.

In the examples depicted in FIGS. 11 and 12, the light directing member 44A includes one micro louver film and is parallel to the sample placement plate 3. The light directing member 44C includes one micro louver film and is inclined with respect to the sample placement plate 3. The light directing members 44B and 44D each include one micro louver film, and these micro louver films are inclined with respect to the sample placement plate 3 at an angle different from the angle of the micro louver film of the light directing member 44C. Such a configuration allows the light directing member 44A, 44B, 44C, or 44D to be placed over the surface light source 1 (i.e., placed on an optical path) in accordance with the rotation of the turret 41, thereby allowing different oblique illuminations to be achieved so that sample S can be observed with images having various shading patterns of different strengths.

The turret 41 may include, in addition to the light directing members 44A-44D, light directing members each including any of the micro louver films described above with reference to the first-third embodiments or light directing members including combinations thereof. Such a configuration allows micro louver films with various optical characteristic to be switched between to achieve a variety of illuminations.

The turret 41 depicted in FIG. 12 can have light directing members disposed at four positions on the turret 41. However, a turret that can have light directing members disposed at four or more positions on the turret may be used to place a light directing member, from among the more light directing members, on the optical path.

Observations may be performed without disposing a light directing member within any of the regions on the turret 41 within which light directing members can be placed. This allows an observation with shading provided by a micro louver film and an observation without shading provided by a micro louver film to be switched between. In addition, the turret 41 may have a polarizing plate mounted therein, and a polarization observation is performed by using the polarizing plate together with another polarizing plate attached to an edge portion of the objective 4 on the sample-S side. In addition, dark-field illumination can be performed by blocking only a center of the light emission plane of the surface light source.

FIGS. 13A-13D depict images of nematodes (C. elegans) on agar media that are each captured using a different micro louver film combination to achieve a different shading pattern, wherein the nematodes are samples observed using a microscope apparatus (illumination apparatus) having the configuration of the present invention described above (including the first-third embodiments and combinations thereof).

In the basic research field of biology, microscope apparatuses with transmitted illumination have been used to observe a model organism having a relatively transparent body. Such model organisms include nematodes raised on an agar medium. The present application provides differences between views of the organisms as examples. Other model organisms include samples raised or cultured within a liquid, such as the embryo of fish (e.g., cyprinodont, zebrafish) and the embryo of mammals (e.g., mouse). To observe such a sample, the sample is not placed directly on the sample placement plate 3, but a container (e.g., plastic scale) having the sample put therein is placed on the sample placement plate 3.

Figure 14:
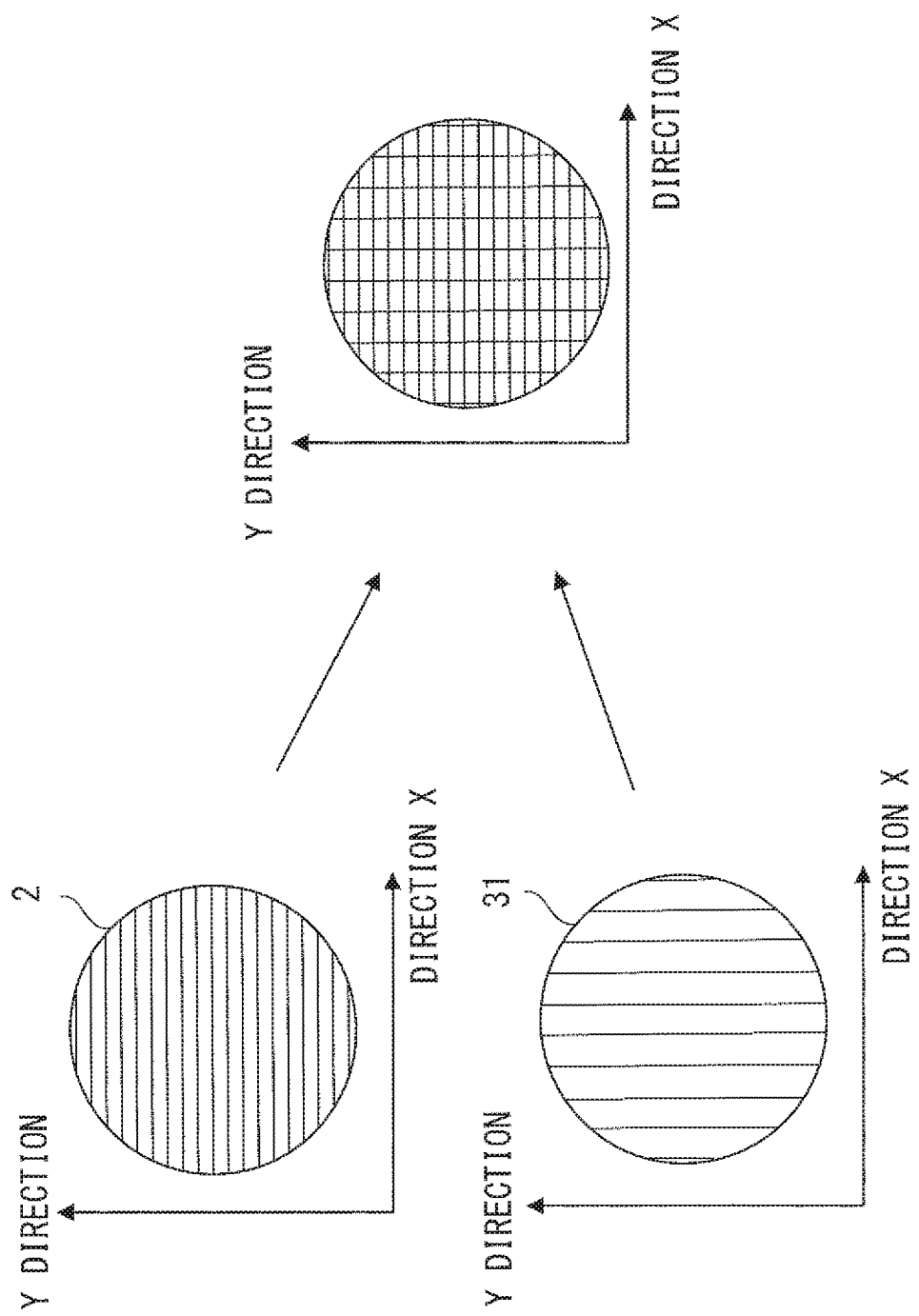
FIG. 14 is an explanatory diagram for examples of micro louver films placed within an illumination apparatus to obtain images depicted in FIGS. 13A-13D.

FIG. 14 is an explanatory diagram for micro louver films placed within the illumination apparatus when the images depicted in FIGS. 13A and 13D were obtained. As described above with reference to the third embodiment, the illumination apparatus includes micro louver films 2 and 31 stacked atop one another in Z direction and controls the divergence of illumination light for X and Y directions. In particular, the image indicated in FIG. 13A is an image of sample S captured with spread angles A of 60 degrees in X direction and 40 degrees in Y direction. The image indicated in FIG. 13A has the feature wherein bumps and dips on the surface of the agar medium are unclear, while the nematodes are clear owing to shading.

FIG. 15 is an explanatory diagram for micro louver films placed within the illumination apparatus when the image depicted in FIG. 13B was obtained. The illumination apparatus includes two micro louver films (micro louver films 2 and 31), wherein both of the micro louver films are configured to be rotatable about an axis extending in Z direction. In particular, the two micro louver films are each configured in a manner such that a direction for which the divergence of light is limited can be adjusted as appropriate.

The rotatable mechanism described above with reference to the second embodiment, i.e., a rotatable mechanism that inclines a micro louver film with X axis serving as a rotation axis, may be provided to incline the micro louver films 2 and 31.

In particular, the image indicated in FIG. 13B is an image of sample S captured with one micro louver film inclined in the positive direction by about 45 degrees relative to the X direction (Y direction) on XY plane, with another micro louver film inclined in the negative direction by about 45 degrees, and with a spread angle A of 40 degrees formed in the direction for which each micro louver film limits illumination light. Image B is provided with shading such that the structure of the inside of the nematode body can be clearly seen.

Figure 16:
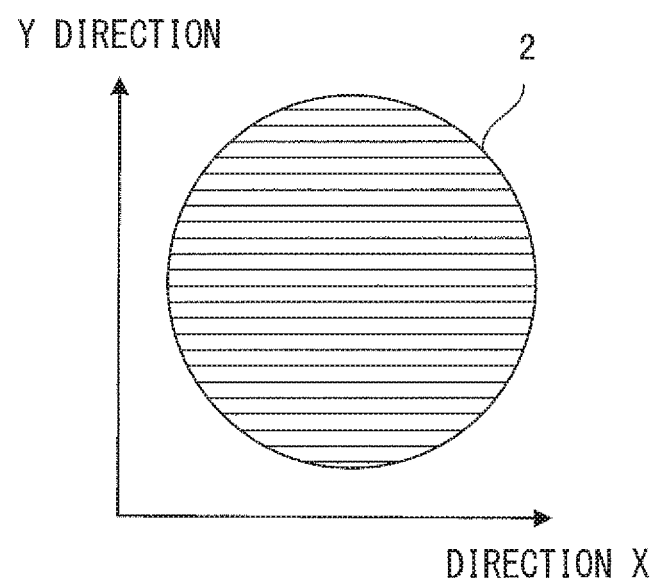
FIG. 16 is an explanatory diagram for an example of a micro louver film placed within an illumination apparatus to obtain images depicted in FIGS. 13A-13D.

FIG. 16 is an explanatory diagram for a micro louver film placed within the illumination apparatus when the image depicted in FIG. 13C was obtained. The illumination apparatus includes a micro louver film 2 that limits the divergence of light for Y direction. In particular, the image depicted in FIG. 13C is an image of sample S captured with a spread angle A of 60 degrees in Y direction. The shading in the image indicated in FIG. 13C is weaker than those in the other images and close to the weakest shading suitable for the observation of sample S. It is difficult to detect small nematodes in the image indicated in FIG. 13C, and only large nematodes can be easily selectively detected.

The image indicated in FIG. 13D is an image captured using an illumination apparatus that has the micro louver configuration depicted in FIG. 14. In particular, the image indicated in FIG. 13D is an image of sample S captured with a spread angle A of 20 degrees in both X and Y directions. The shading in the image indicated in FIG. 13D is stronger than those in the other images and close to the strongest shading suitable for the observation of sample S. Large portions of the surfaces of the nematodes in the image indicated in FIG. 13D are blacked out, and detailed structures are difficult to observe. However, the image is appropriate for the observation of the movements of nematodes because bumps and dips of paths of the movements of the nematodes on the agar medium are the clearest.

In consideration of the idea of what is described above, descriptions will be given of conditional expression (1).

$$20° \leq A \leq 60° \quad (1)$$

When spread angle A exceeds an upper limit of 60 degrees, light refracted at an edge portion is received to some degree via the objective 4, thereby making the shading weaker than that in FIG. 13C. In particular, a smaller angle of refraction caused by sample S results in weaker shading, thereby making the image less clear.

When spread angle A is less than a lower limit of 20 degrees, light rays forming a larger angle are not incident, and hence many light rays refracted by edge portions do not reach the objective 4, with the result that shading becomes stronger than that indicated in FIG. 13D. Excessively strong shading increases the percentage of blacked-out regions and thus makes it difficult to observe sample S (nematodes).

Any of the images of FIGS. 13A-13D can be the most appropriate in accordance with, for example, the purpose of a research to be performed. However, the shading in the image of FIG. 13C is close to the weakest shading, and the shading in the image of FIG. 13D is close to the strongest shading. Accordingly, it is clear that when conditional expression (1'), which further limits spread angle A, is satisfied, the image can have more appropriate shading.

Accordingly, performing illumination using the illumination apparatus 10 with conditional expression (1) satisfied allows sample S to be observed with appropriate shading, as indicated by the images of FIGS. 13A-13D.

As described above, selecting a spread angle A with conditional expression (1) satisfied allows observations appropriate for various purposes to be performed.

Optimal views are different for individual samples or research objectives, and hence the illumination apparatus has a variation in maximum spread angle for optimum illumination light. Accordingly, combinations of maximum spread angles of illumination light are desirably selectable in accordance with a purpose of an observation.

Figure 17:
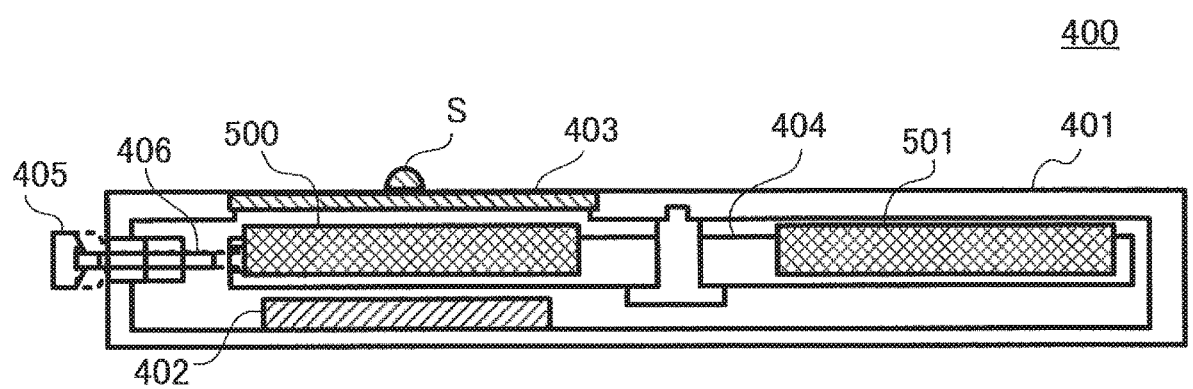
FIG. 17 illustrates the configuration of an illumination apparatus in accordance with a fourth embodiment.
Figure 18:
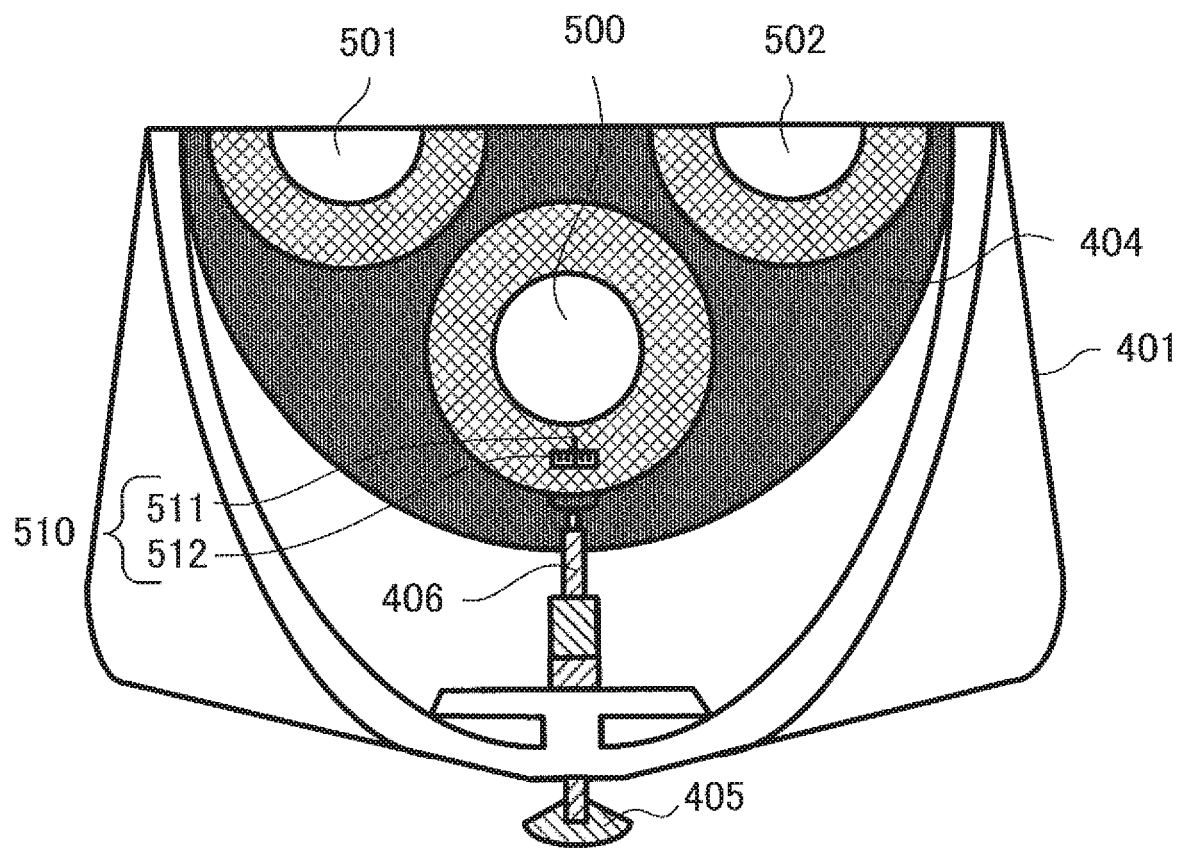
FIG. 18 is a cross-sectional view of an illumination apparatus depicted in FIG. 17.

FIG. 17 illustrates the configuration of an illumination apparatus 400 in accordance with a fourth embodiment, wherein FIG. 17 is a vertical cross-sectional view of the illumination apparatus 400 along the rotation axis of the manipulation part 405 as seen from the horizontal direction. FIG. 18 is a cross-sectional view of the illumination apparatus 400 depicted in FIG. 17, wherein FIG. 18 is a cross-sectional view of the illumination apparatus 400 cut horizontally between the mount 403 and the cartridge as seen from above in the vertical direction. The illumination apparatus 400 is largely different form the illumination apparatus depicted in FIG. 11 in that cartridges (cartridges 500, 501, and 502) attachable/detachable to/from a turret 404 accommodate optical members, that the position or posture of the optical member within the cartridge can be externally adjusted, and that the user can identify the position or posture of the optical member within the cartridge. The following describes the configuration of the illumination apparatus 400 in accordance with the fourth embodiment by referring to FIGS. 17 and 18.

The illumination apparatus 400 includes a surface light source 402, a mount 403, a turret 404 mounted with cartridges (500-501), and a display part 510. The illumination apparatus 400 may further include a housing 401, a manipulation part 405, and a link part 406.

The illumination apparatus 400, which is a transmitted illumination apparatus, modulates illumination light emitted from the surface light source 402 using an optical member provided within the cartridge 500 and emits the modulated illumination light to sample S via the mount 403.

The mount 403, i.e., amount on which a sample is placed, forms a portion of a top surface of the illumination apparatus 400. The mount 403 is a transparent plate, e.g., a glass plate or an acrylic plate.

The turret 404 is an example of a supporting base for supporting a cartridge between the surface light source 402 and the mount 403. The turret 404 supports the cartridge in an attachable/detachable manner. The turret 404 can be mounted with a plurality of cartridges and places one cartridge selected from these cartridges at a position between the surface light source 402 and the mount 403. In this example, the turret 404 places the cartridge 500 between the surface light source 402 and the mount 403.

Each of the cartridges (cartridges 500, 501, and 502) includes an optical member and a mechanical structure. The optical member blocks at least a portion of illumination light emitted from the surface light source 402. For example, the optical member may be the micro louver film described above or may be a light blocking shroud. The mechanical structure moves the optical member so as to change the position or posture of the optical member within the cartridge. The mechanical structure may include any mechanical element, e.g., a gear, a spring. Details of each cartridge will be described hereinafter.

The display part 510, which is an example of means for reporting the position or posture of an optical member within the cartridge 500 to a user, displays the position or posture of the optical member. The display part 510 is provided at the cartridge 500 and includes an indicator 511 and a scale 512. The display part 510 is such that the scale 512 is moved relative to the indicator 511 in accordance with the position or posture of the optical member. Accordingly, the indicator 511 can indicate different positions within the scale 512 so that the user can identify the position or posture of the optical member by checking the display part 510.

In this example, the scale 512 is moved. However, it is only necessary that one of the indicator 511 and the scale 512 be moved relative to the other, and for example, the indicator 511 may be moved relative to the scale 512 in accordance with the position or posture of the optical member. Also in this case, the indicator 511 can indicate different positions within the scale 512 in accordance with the position or posture of the optical member, so that the user can identify the position or posture of the optical member by checking the display part 510.

One of the indicator 511 and the scale 512 is desirably moved in conjunction with the mechanical structure relative to the other. In particular, the indicator 511 or the scale 512 may be provided at a portion of the surface of the mechanical structure so as to simplify the structure.

The manipulation part 405 is a member manipulated by the user to change the position or posture of the optical member within the cartridge 500 disposed between the surface light source 402 and the mount 403. For example, the manipulation part 405 may be a dial.

The link part 406 is a member that transfers a force applied to the manipulation part 405 to the mechanical structure within a cartridge. The link part 406 transfers a force from the manipulation part 405 manipulated by the user to the mechanical structure within the cartridge, so that the mechanical structure can change the position or posture of the optical member in accordance with the manipulation performed by the user.

In this example, the link part 406 is a bar member connected to, and extending from, the manipulation part 405. As indicated by a dotted line in FIG. 17, for example, the manipulation part 405 may be push toward the housing 401 so as to make the link part 406 engage the mechanical structure within the cartridge 500. Accordingly, the link part 406 may be rotated to transfer torque to the mechanical structure via the link part 406, thereby changing the position or posture of the optical member. While the manipulation part 405 is not pushed, the manipulation part 405 is held at a predetermined position by an elastic member (not illustrated). In this condition, the link part 406 is not in contact with the cartridge 500, and hence tasks such as the attaching or detaching of the cartridge 500 and the rotating of the turret 404 can be performed without being hindered by the link part 406.

The manipulation part 405 and the link part 406 of the illumination apparatus 400 are provided at the housing 401 accommodating the turret 404. However, the manipulation part 405 and the link part 406 may be provide at a supporting base such as the turret 404.

Figure 19:
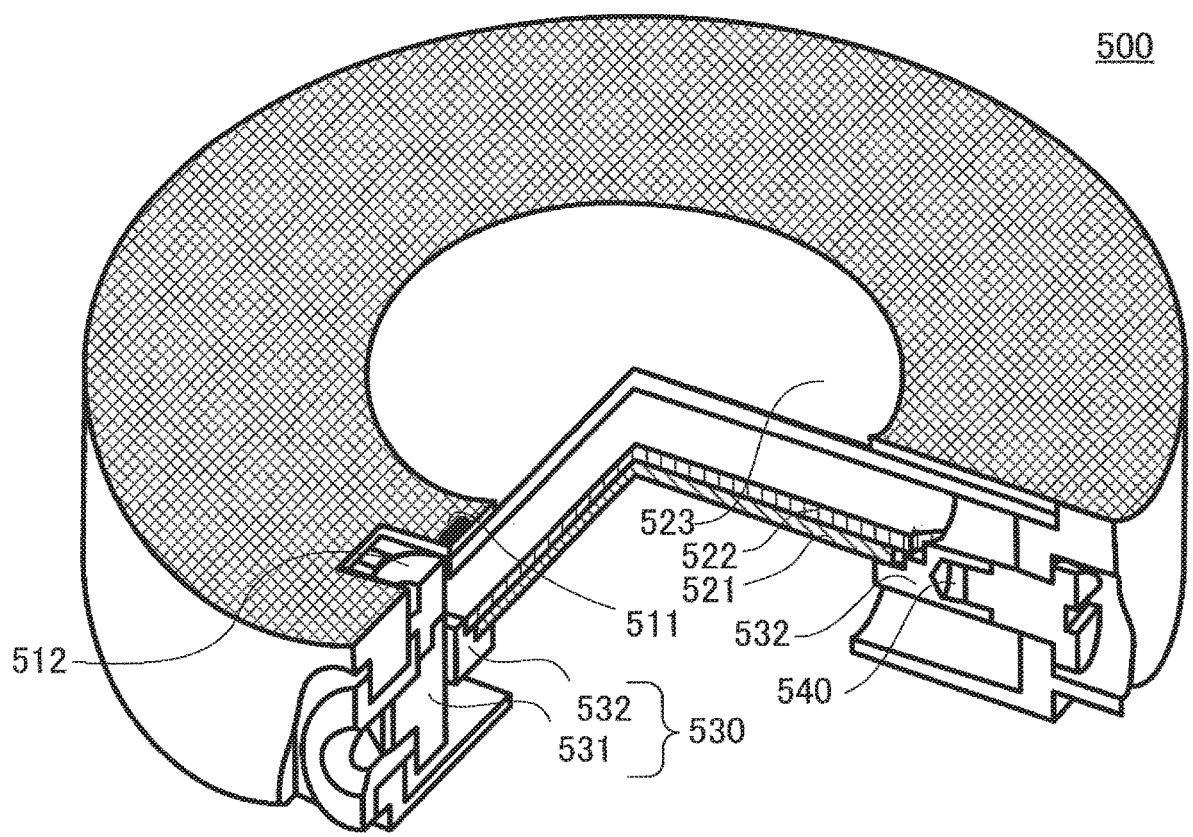
FIG. 19 exemplifies the configuration of a cartridge.
Figure 20:
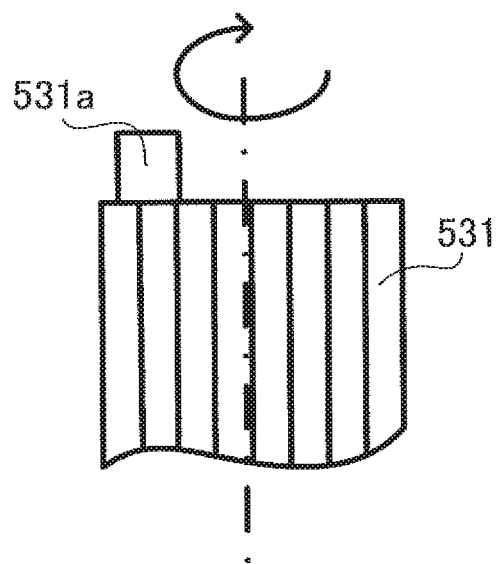
FIG. 20 illustrates the configuration of a rotatable member.
Figure 21:
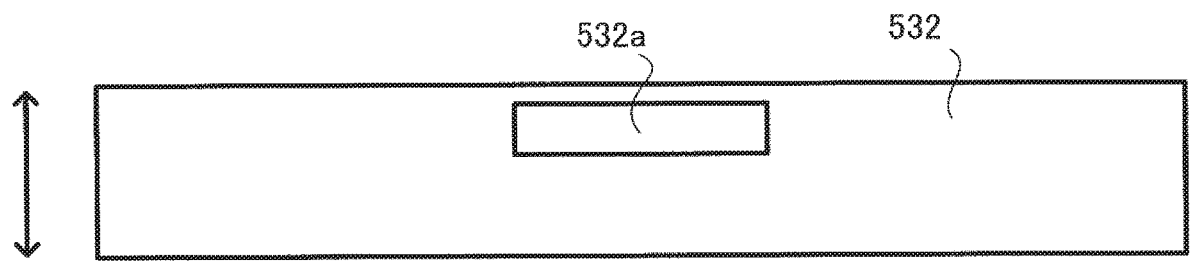
FIG. 21 illustrates the configuration of a supporting member that engages a rotatable member depicted in FIG. 20.
Figure 22A:
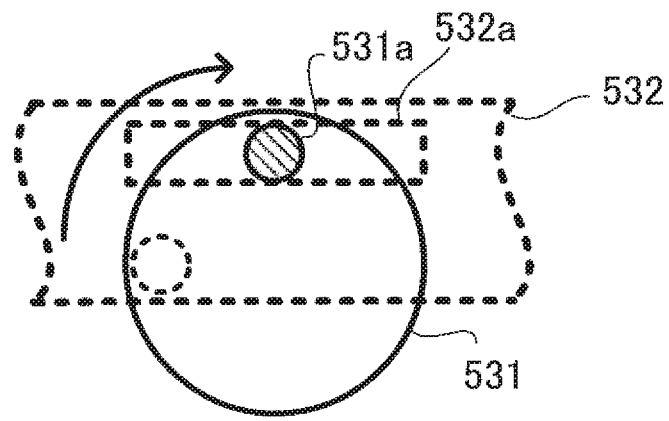
FIG. 22A exemplifies a relationship in position between a rotatable member and a supporting member.
Figure 22B:
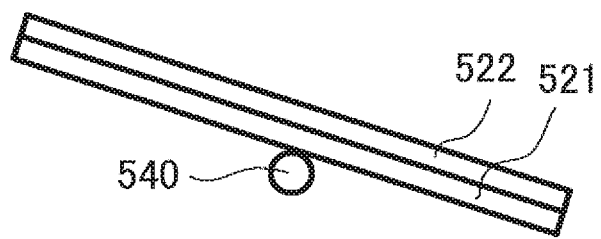
FIG. 22B exemplifies an optical member in a state depicted in FIG. 22A.
Figure 23A:
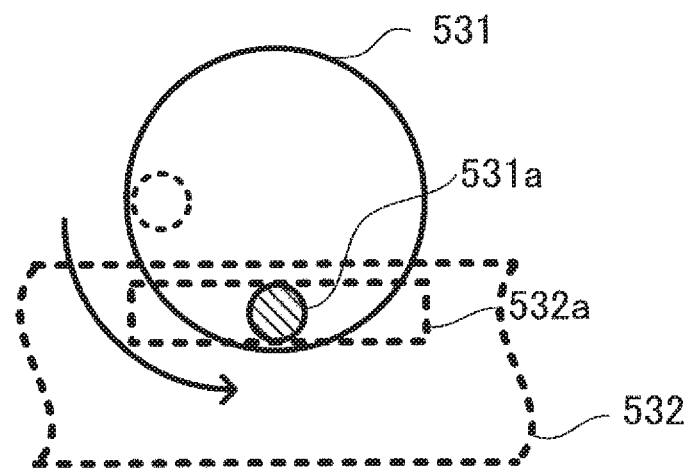
FIG. 23A illustrates another example of a relationship in position between a rotatable member and a supporting member.
Figure 23B:
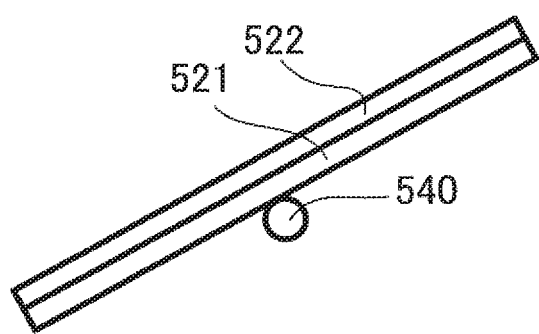
FIG. 23B exemplifies an optical member in a state depicted in FIG. 23A.

FIG. 19 exemplifies the configuration of the cartridge 500. FIG. 20 illustrates the configuration of a rotatable member 531. FIG. 21 illustrates the configuration of a supporting member 532 that engages the rotatable member 531. FIG. 22A illustrates an example of a relationship in position between the rotatable member 531 and the supporting member 532. FIG. 22B exemplifies an optical member in a state depicted in FIG. 22A. FIG. 23A illustrates another example of a relationship in position between the rotatable member 531 and the supporting member 532. FIG. 23B exemplifies an optical member in a state depicted in FIG. 23A. The following describes in detail the configuration of the cartridge 500 mounted in the illumination apparatus 400 by referring to FIGS. 19-23B.

As depicted in FIG. 19, the cartridge 500 includes, on a path of illumination light, two micro louver films (micro louver films 521 and 522) supported by the supporting member 532. For example, the supporting member 532 may have a toric shape and support the side surface of a circular micro louver film. The cartridge 500 further includes a diffuser plate 523 located on a path of illumination light and separated from the two micro louver films.

Each of the two micro louver films is an optical member that blocks at least a portion of illumination light emitted from the surface light source 402. Each of the two micro louver films limits, for at least one direction, the spread angle of an illumination light flux emitted from the micro louver film. The two micro louver films are stacked atop one another in a manner such that directions for which spread angles are limited are orthogonal to each other, as with, for example, the micro louver films 2 and 31 depicted in FIG. 9. A mechanical structure 530 changes the posture of the two micro louver films. The two micro louver films each desirably satisfy conditional expression (1).

As depicted in FIG. 19, the cartridge 500 further includes the mechanical structure 530 and a rotation shaft 540 that supports the supporting member 532 in a rotatable manner. The mechanical structure 530 changes the posture of an optical member disposed within the cartridge 500 by moving the two micro louver films. In particular, the mechanical structure 530 includes the rotatable member 531 that engages the link part 406 and the supporting member 532 that engages the rotatable member 531.

The rotatable member 531 has a circular cross section. As depicted in FIG. 20, the rotatable member 531 includes an eccentric pin 531a at a position that is not the center of rotation of the rotatable member and that is located at one edge of the rotatable member 531 in the axial direction, the eccentric pin 531a extending from an edge surface of the main body of the rotatable member 531.

A lateral groove 532a is formed in a portion of the supporting member 532 that corresponds to the rotatable member 531, as depicted in FIG. 21. The eccentric pin 531a of the rotatable member 531 engages the lateral groove 532a.

The rotation shaft 540 supports the supporting member 532 in a rotatable manner. The position of the rotation shaft 540 is 90 degrees from the position of the rotatable member 531 included in the mechanical structure 530 in the circumferential direction of the circular micro louver film.

As depicted in FIG. 19, the cartridge 500 further includes the indicator 511 and the scale 512. The indicator 511 and the scale 512 are display parts for displaying information on the posture of an optical member.

The scale 512 is provided on a portion of a surface of the rotatable member 531 and exposed to the outside through an aperture formed in the housing of the cartridge 500. The indicator 511 is provided in the vicinity of the aperture formed in the housing of the cartridge 500. The indicator 511 is provided on a surface of the housing of the cartridge 500. Accordingly, the scale 512 of the cartridge 500 is moved in conjunction with rotation of the rotatable member 531 relative to the indicator 511.

The cartridge 500 having the configuration described above is such that the manipulation part 405 is rotated while the manipulation part 405 is in a pushed state, so as to rotate the rotatable member 531 that engages the link part 406. In response to this, a portion of the supporting member 532 that faces the rotatable member 531 is moved in the up-down direction in accordance with movement of the eccentric pin 531a that engages the lateral groove 532a. More particularly, the eccentric pin 531a presses the supporting member 532 in the up-down direction while the eccentric pin 531a is being slid along the groove, thereby moving the portion of the supporting member 532 that faces the rotatable member 531 in the up-down direction.

For example, the eccentric pin 531a may be moved to a position above the rotation axis of the rotatable member 531, as depicted in FIG. 22A. Thus, as depicted in FIG. 22B, the optical members (micro louver films 521 and 522) are rotated about the rotation shaft 540, thereby changing the posture of the optical members in a manner such that portions of the optical members closer to the manipulation part 405 are located at a higher position, and portions of the optical members farther from the manipulation part 405 are located at a lower position. Simultaneously, the scale 512 provided on the surface of the rotatable member 531 is moved relative to the indicator 511 in accordance with the rotation amount of the rotatable member 531. Accordingly, the indicator 511 indicates a position within the scale 512 that depends on the rotation amount of the rotatable member 531, i.e., a position within the scale 512 that depends on the posture of the optical element.

For example, the eccentric pin 531a may be moved to a position below the rotation axis of the rotatable member 531, as depicted in FIG. 23A. Thus, as depicted in FIG. 23B, the optical members (micro louver films 521 and 522) are rotated about the rotation shaft 540, thereby changing the posture of the optical members in a manner such that portions of the optical members closer to the manipulation part 405 are located at a lower position, and portions of the optical members farther from the manipulation part 405 are located at a higher position. Simultaneously, the scale 512 provided on the surface of the rotatable member 531 is moved relative to the indicator 511 in accordance with the rotation amount of the rotatable member 531. Accordingly, the indicator 511 indicates a position within the scale 512 that depends on the rotation amount of the rotatable member 531, i.e., a position with the scale 512 that depends on the posture of the optical element.

As described above, the illumination apparatus 400 and the cartridge 500 are such that the manipulation part 405 provided outside the cartridge 500 may be manipulated to change the posture of the optical member within the cartridge 500 so as to perform oblique illumination. In addition, the display part 510 displays information on the posture of the optical element within the cartridge 500 so that the user can be easily informed of the posture of the optical member after adjustment.

Since the cartridge 500 can be attached/detached to/from the illumination apparatus 400, the state (rotation angle) of the manipulation part 405 may incorrectly indicate the posture of the optical member within the cartridge 500. This is because while the cartridge 500 is not attached, an action of manipulating the manipulation part 405 does not affect the optical member. However, providing the cartridge 500 with the display part 510 allows a change in the posture of the optical member to be always reflected within the display. Hence, the illumination apparatus 400 and the cartridge 500 allow the user to be correctly informed of the posture of the optical member after adjustment. This can lead to the avoidance of the following situations that could often occur when an attachable/detachable cartridge is used: a situation in which conditions observed in the past cannot be duplicated, and a situation in which observation procedures, including designation of the posture of an optical member, cannot be indicated.

The cartridge 500 changes the posture of the optical member by rotating the optical member about a rotation axis extending in a direction orthogonal to the axis of illumination light. However, the cartridge 500 may change the posture of the optical member by rotating the optical member about a rotation axis extending in a direction in which the axis of illumination light extends. Accordingly, the spread angle can be limited for different directions so that a direction in which shading is provided can be adjusted.

Figure 24:
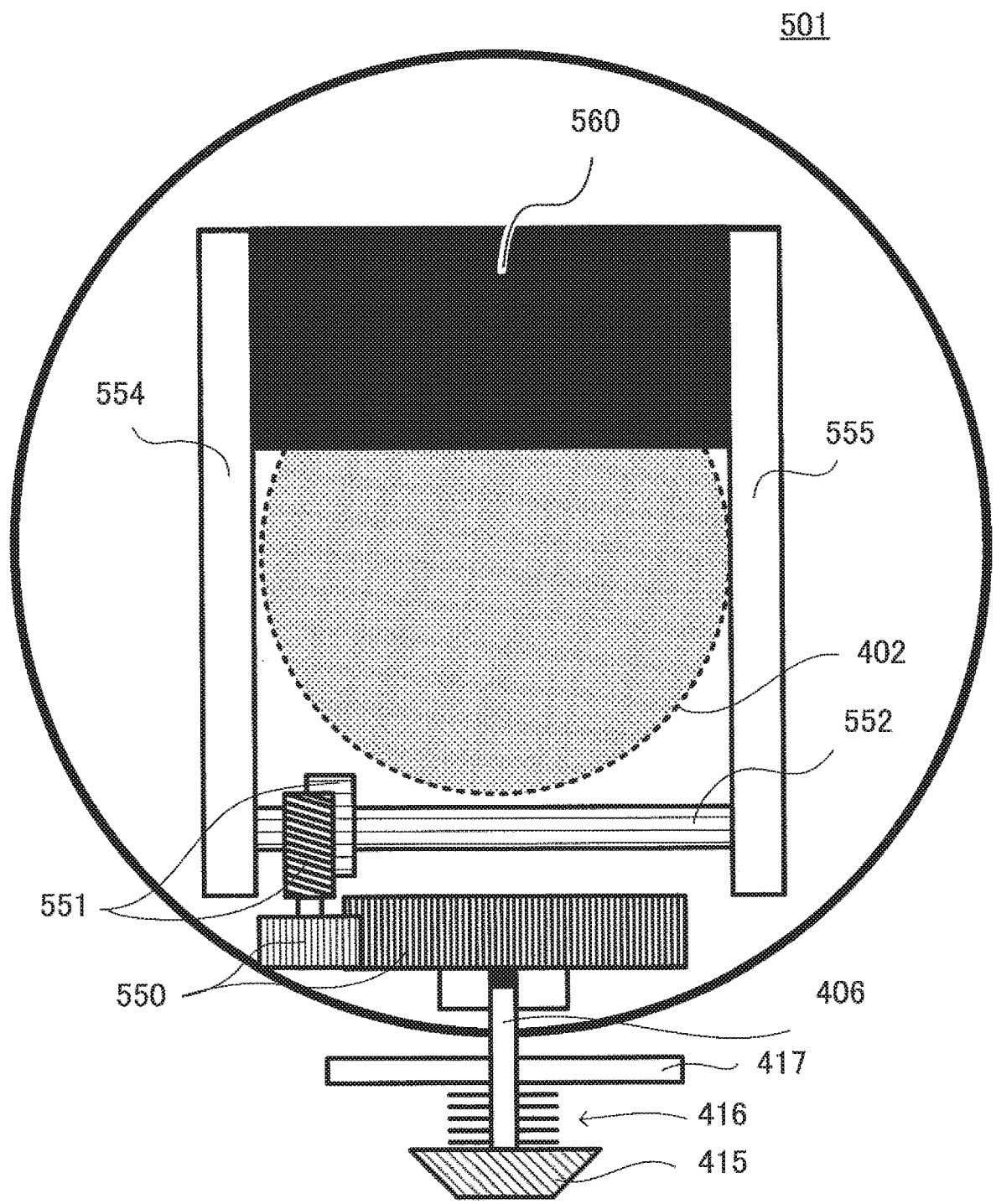
FIG. 24 illustrates another example of the configuration of a cartridge.
Figure 25A:
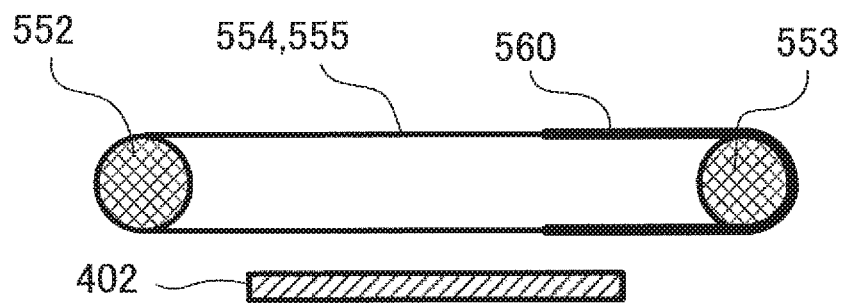
FIG. 25A is a diagram illustrating a situation in which a light blocking shroud is moved within a cartridge depicted in FIG. 24.
Figure 25B:
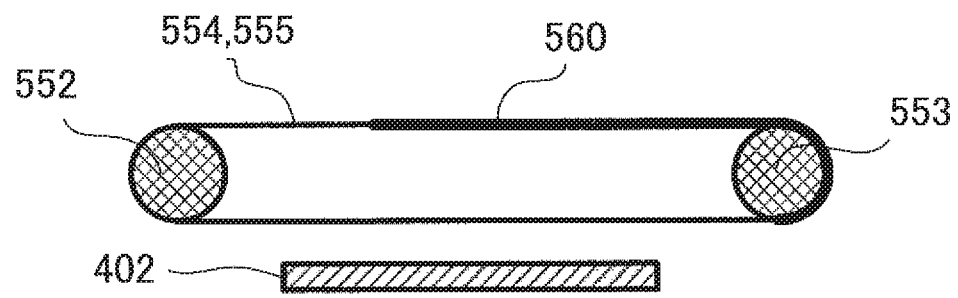
FIG. 25B is another diagram illustrating a situation in which a light blocking shroud is moved within a cartridge depicted in FIG. 24.

FIG. 24 exemplifies the configuration of the cartridge 501. FIGS. 25A and 25B illustrate a situation in which a light blocking shroud is moved within the cartridge 501 depicted in FIG. 24. The following describes in detail the configuration of the cartridge 501 mounted in the illumination apparatus 400 by referring to FIGS. 24-25B.

As depicted in FIG. 24, the cartridge 501 includes a light blocking shroud 560 that blocks illumination light and a mechanical structure that changes the position of the light blocking shroud 560. The light blocking shroud 560 is an example of an optical member that blocks at least a portion of illumination light emitted from the surface light source 402.

The cartridge 501 has a mechanical structure that includes a gear line 550, a worm gear 551, a driving axle 552, a driven axle 553, a belt 554, and a belt 555, as depicted in FIGS. 24, 25A, and 25B.

The link part 406 engages the gear line 550. FIG. 24 depicts an example in which the link part 406 is connected to a manipulation part 415, not the manipulation part 405. While the link part 406 engages the gear line 550, the manipulation part 415 stores a restoring force owing to a spring 416 fixed to a plate 417. Accordingly, releasing the force applied to the manipulation part 415 leads to pressing by the restoring force the link part 406 back to the original position together with the manipulation part 415, thereby releasing the engagement of the link part 406 and the gear line 550.

The worm gear 551 is connected to a shaft of a gear of the gear line 550. Rotating the manipulation part 415 with the link part 406 and the gear line 550 engaging each other rotates the gear line 550, thereby transferring torque to the driving axle 552 via the worm gear 551. Accordingly, the driving axle 552 is rotated to move the belts 554 and 555 looped over the driving axle 552 and the driven axle 553. The light blocking shroud 560 is fixed to the belts 554 and 555 and is thus moved with the movement of the belts 554 and 555, as depicted in FIGS. 25A and 25B.

As with the cartridge 500, the cartridge 501 includes a display part. For example, the display part of the cartridge 501 may include a scale provided on a surface of a member operated in conjunction with the gear line 550, and an indicator provided on the housing of the cartridge 501. Accordingly, the indicator indicates a position within the scale that depends on the position of an optical member.

The illumination apparatus 400 and the cartridge 501 are such that the manipulation part 415 provided outside the cartridge 501 may be manipulated to change the position of the optical member within the cartridge 501 so as to perform oblique illumination. In addition, the display part (not illustrated) displays information on the position of the optical member within the cartridge 501 so that the user can be easily informed of the position of the optical member after adjustment.

Providing the cartridge 501 with a display part allows a change in the position of the optical member to be always reflected within the display. Hence, the illumination apparatus 400 and the cartridge 501 allow the user to be correctly informed of the position of the optical member after adjustment. This can lead to the avoidance of the following situations that could often occur when an attachable/detachable cartridge is used: a situation in which conditions observed in the past cannot be duplicated, and a situation in which an observation procedure cannot be indicated.

Figure 26:
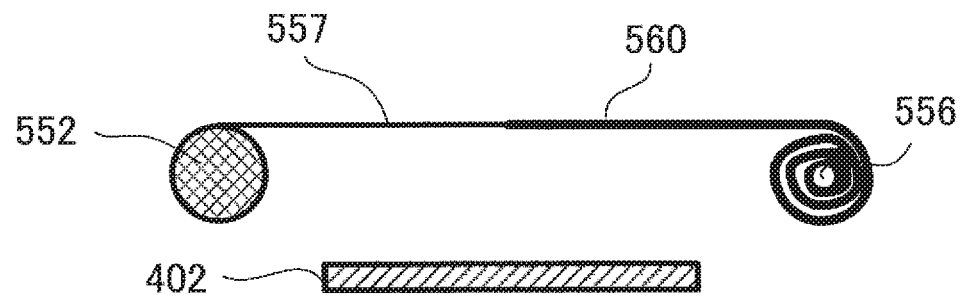
FIG. 26 illustrates a variation of a cartridge depicted in FIG. 24.

FIG. 26 illustrates a variation of the cartridge 501 depicted in FIG. 24. The cartridge 501 includes the worm gear 551. Thus, when the worm gear 551 is in a resting state, the cartridge 501 is locked, and the position of the light blocking shroud 560 is not easily moved. Accordingly, the cartridge 501 may include a flat spiral spring 556, in place of the driven axle 553, and one edge of the light blocking shroud 560 may be fixed to the flat spiral spring 556. Also in this case, the manipulation part 415 may be manipulated to change the position of the light blocking shroud 560 within the cartridge 501, as in a situation in which the driven axle 553 depicted in FIGS. 25A and 25B is provided.

The embodiments described above are indicated as specific examples to facilitate the understanding of the invention, and the invention is not limited to these embodiments. Various modifications or changes can be made to the illumination apparatus and the microscope apparatus described above without departing from the invention recited in the claims.

In, for example, the fourth embodiment, the cartridge 500 includes the display part 510. However, the cartridge 500 may include at least a portion of the display part 510. For example, the cartridge 500 may include the indicator 511, and the turret 404 may include the scale 512. Alternatively, the cartridge 500 may include the scale 512, and the turret 404 may include the indicator 511. In particular, the cartridge 500 may include at least one of the indicator 511 and/or the scale 512. In the other words, the cartridge 500 may include one or more of the indicator 511 or the scale 512.

Although a display part that includes the indicator 511 and the scale 512 was exemplified with reference to the fourth embodiment, the configuration of the display part is not limited to this. As long as information on the position or posture of an optical member after a change made by the mechanical structure can be displayed, the display part may be, for example, an electronic device such as a liquid crystal device. It is also desirable in this case that the cartridge 500 include the display part; however, for example, the display part may be disposed outside the cartridge, and in this case, the cartridge and the display part may be electrically connected.

A display part that displays information on the position or posture of an optical member was described with reference to the fourth embodiment. However, as long as the illumination apparatus includes means for informing the user of the position or posture of an optical member, the display is not the only way for the reporting. For example, the position or posture of an optical member may be conveyed using a click feeling or sound resulting from the manipulating of the manipulation part.

What is claimed is:

1. A transmitted illumination apparatus for a microscope having an objective, the illumination apparatus comprising:
    a surface light source disposed on an optical axis of the objective such that at least a portion of illumination light emitted by the illumination apparatus enters the objective, the surface light source having a light emission plane configured to emit the illumination light; and
    a micro louver film configured to limit components of a divergence of the illumination light that are parallel to the light emission plane of the surface light source,
    wherein the following conditional expression is satisfied:

$$20° \leq A \leq 60° \qquad (1)$$

where A indicates, with reference to a direction for which the micro louver film limits the divergence of the illumination light, a maximum spread angle of the illumination light having passed through the micro louver film, the maximum spread angle being symmetrical about the optical axis of the objective.

2. The illumination apparatus of claim 1, wherein:
    the micro louver film includes a plurality of light blocking plates disposed apart from each other,
    the plurality of light blocking plates each have a surface with a light blocking property, and
    a plane including the surface of each of the plurality of light blocking plates that has the light blocking property intersects the light emission plane of the surface light source.

3. A microscope apparatus comprising:
    the illumination apparatus of claim 2;
    a sample placement plate which has optical transparency and on which a sample is placed, the sample placement plate being provided to dispose the micro louver film between the sample placement plate and the surface light source; and
    a detection optical system located on an opposite side from the surface light source when seen from the sample placement plate, the detection optical system receiving light from the sample,
    wherein:
    the surface light source and the micro louver film are positioned in a manner such that the illumination light is emitted to the sample via the micro louver film, and
    the following conditional expression is satisfied:

$$P < NA \times L \qquad (2)$$

where P indicates an interval between the plurality of light blocking plates, NA indicates a numerical aperture of the detection optical system, and L indicates a distance between a surface of the sample placement plate on which the sample is placed and an end portion of the micro louver film on a sample-placement-plate side.

4. The illumination apparatus of claim 1, further comprising:
    a rotatable mechanism configured to rotate the micro louver film about an axis parallel to the light emission plane of the surface light source so as to incline the micro louver film.

5. The illumination apparatus of claim 1, further comprising:
    a rotatable mechanism configured to rotate the micro louver film about an axis extending in a direction normal to the light emission plane of the surface light source.

6. The illumination apparatus of claim 1, further comprising:
    a plurality of micro louver films that include the micro louver film.

7. The illumination apparatus of claim 1, further comprising:
    a transparent mount on which a sample is placed;
    a cartridge that includes an optical member and a mechanical structure, the optical member blocking at least a portion of illumination light emitted from the surface light source, and the mechanical structure moving the optical member so as to change a position or posture of the optical member within the cartridge;
    a supporting base configured to support the cartridge between the surface light source and the transparent mount in an attachable/detachable manner; and
    a display part configured to display information on the position or posture of the optical member,
    wherein the optical member includes the micro louver film.

8. A microscope apparatus comprising the illumination apparatus of claim 1.

9. The illumination apparatus of claim 1, wherein:
    the micro louver film includes a plurality of light blocking plates disposed parallel to each other and at equal intervals, the plurality of light blocking plates each have a surface with a light blocking property, and the conditional expression (1) is satisfied when the plurality of light blocking plates are disposed such that the surfaces thereof with the light blocking property are orthogonal to the light emission plane of the surface light source.

10. The illumination apparatus of claim 1, wherein:

the micro louver film includes a plurality of light blocking plates disposed parallel to each other and at equal intervals, the plurality of light blocking plates each have a surface with a light blocking property, and the plurality of light blocking plates are disposed such that the surfaces thereof with the light blocking property are orthogonal to the light emission plane of the surface light source.

11. A transmitted illumination apparatus for a microscope having an objective, the apparatus comprising:

a surface light source disposed on an optical axis of the objective of the microscope such that at least a portion of illumination light emitted by the illumination apparatus enters the objective, the surface light source having a light emission plane configured to emit the illumination light;

a transparent mount on which a sample is placed;

a cartridge that includes an optical member and a mechanical structure, the optical member blocking at least a portion of the illumination light emitted from the light emission plane of the surface light source, and the mechanical structure moving the optical member so as to change a position or posture of the optical member within the cartridge;

a supporting base that supports the cartridge between the surface light source and the transparent mount in an attachable/detachable manner; and means for reporting information on the position or posture of the optical member;

wherein:

the optical member includes a micro louver film configured to limit components of a divergence of the illumination light that are parallel to the light emission plane of the surface light source, and the following conditional expression is satisfied:

$$20° \leq A \leq 60° \qquad (1)$$

where A indicates, with reference to a direction for which the micro louver film limits the divergence of the illumination light, a maximum spread angle of the illumination light having passed through the micro louver film, the maximum spread angle being symmetrical about the optical axis of the objective.

12. The illumination apparatus of claim 11, wherein the means includes a display part that displays the information on the position or posture of the optical member.

13. The illumination apparatus of claim 12, further comprising:

a manipulation part manipulable to change the position or posture of the optical member; and a link part configured to transfer a force applied to the manipulation part to the mechanical structure, wherein:

the manipulation part and the link part are provided at the supporting base or a housing accommodating the supporting base, and the cartridge includes at least a portion of the display part.

14. The illumination apparatus of claim 13, wherein:

the display part includes a scale and an indicator, one of the scale and the indicator is moved relative to the other of the scale and the indicator in accordance with the position or posture of the optical member, and the cartridge includes at least one of the scale and the indicator.

15. The illumination apparatus of claim 14, wherein the one of the scale and the indicator is moved relative to the other of the scale and the indicator in conjunction with the mechanical structure.

16. The illumination apparatus of claim 15, wherein the mechanical structure changes at least a posture of the micro louver film.

* * * * *